United States Patent
Oda et al.

(10) Patent No.: US 10,607,509 B2
(45) Date of Patent: Mar. 31, 2020

(54) LINERLESS LABEL AND CUTTING APPARATUS

(71) Applicants: Yasufumi Oda, Shizuoka (JP); Tohru Kitano, Shizuoka (JP)

(72) Inventors: Yasufumi Oda, Shizuoka (JP); Tohru Kitano, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 170 days.

(21) Appl. No.: 15/558,435

(22) PCT Filed: Mar. 11, 2016

(86) PCT No.: PCT/JP2016/001371
§ 371 (c)(1),
(2) Date: Sep. 14, 2017

(87) PCT Pub. No.: WO2016/147630
PCT Pub. Date: Sep. 22, 2016

(65) Prior Publication Data
US 2018/0061281 A1    Mar. 1, 2018

(30) Foreign Application Priority Data
Mar. 18, 2015    (JP) .................. 2015-054359

(51) Int. Cl.
*G09F 3/02*    (2006.01)
*B26D 1/09*    (2006.01)
(Continued)

(52) U.S. Cl.
CPC ............. *G09F 3/02* (2013.01); *B05D 5/10* (2013.01); *B26D 1/085* (2013.01); *B26D 1/095* (2013.01);
(Continued)

(58) Field of Classification Search
None
See application file for complete search history.

(56) References Cited

U.S. PATENT DOCUMENTS

| 6,357,941 B1 | 3/2002 | Amano et al. |
| 2004/0163556 A1* | 8/2004 | Kugo .................. B65C 9/1803 101/226 |

(Continued)

FOREIGN PATENT DOCUMENTS

| CN | 100393529 C | 6/2008 |
| CN | 102343726 A | 2/2012 |

(Continued)

OTHER PUBLICATIONS

Machine translation JP2000-356952 (Year: 2000).*
(Continued)

*Primary Examiner* — Alexandre F Ferre
(74) *Attorney, Agent, or Firm* — Oblon, McClelland, Maier & Neustadt, L.L.P.

(57) ABSTRACT

A linerless label including a support, a release layer over one surface of the support, and an adhesive layer over another surface of the support, wherein when the linerless label is cut with an apparatus including a mechanism in which an upper blade of cutter blades is immobilized and a lower blade of the cutter blades is configured to move upward, in a manner that the lower blade is inserted into the linerless label from a side of the linerless label at which the adhesive layer is provided, a cutter load voltage during a cutter operation performed after the linerless label is cut five thousand times repeatedly has a difference of less than or equal to 2.0 V from the cutter load voltage during cutting of a label support, which is the linerless label before treated to have adhesiveness.

5 Claims, 7 Drawing Sheets

(51) Int. Cl.
- *B05D 5/10* (2006.01)
- *B41J 11/70* (2006.01)
- *B41J 3/407* (2006.01)
- *G09F 3/10* (2006.01)
- *B26D 1/08* (2006.01)
- *B31D 1/02* (2006.01)
- *B32B 33/00* (2006.01)
- *B26D 1/00* (2006.01)
- *B32B 43/00* (2006.01)
- *B32B 38/00* (2006.01)

(52) U.S. Cl.
CPC ............ *B31D 1/021* (2013.01); *B31D 1/026* (2013.01); *B32B 33/00* (2013.01); *B41J 3/4075* (2013.01); *B41J 11/70* (2013.01); *B41J 11/703* (2013.01); *G09F 3/10* (2013.01); *B26D 2001/006* (2013.01); *B26D 2001/0066* (2013.01); *B32B 38/0004* (2013.01); *B32B 43/003* (2013.01); *B32B 2519/00* (2013.01); *G09F 2003/0211* (2013.01)

(56) References Cited

U.S. PATENT DOCUMENTS

| | | |
|---|---|---|
| 2011/0061802 A1 | 3/2011 | Raming |
| 2012/0027496 A1 | 2/2012 | Mochida et al. |
| 2013/0255457 A1 | 10/2013 | Yazawa et al. |
| 2014/0083895 A1 | 3/2014 | Raming |
| 2014/0234558 A1 | 8/2014 | Ikeda et al. |

FOREIGN PATENT DOCUMENTS

| | | | |
|---|---|---|---|
| JP | 10-177344 A | | 6/1998 |
| JP | 11-000892 A | | 1/1999 |
| JP | 2000-284694 A | | 10/2000 |
| JP | 2000356952 A | * | 12/2000 |
| JP | 2003-089247 A | | 3/2003 |
| JP | 2004-233883 A | | 8/2004 |
| JP | 2004-261916 A | | 9/2004 |
| JP | 2007-171776 A | | 7/2007 |
| JP | 2007-212693 A | | 8/2007 |
| JP | 2011-007890 A | | 1/2011 |
| JP | 2011-201687 A | | 10/2011 |
| JP | 2012-128369 A | | 7/2012 |
| JP | 2013-029604 A | | 2/2013 |
| JP | 2013-121718 A | | 6/2013 |

OTHER PUBLICATIONS

Partial Supplementary European Search Report dated May 14, 2018 in European Patent Application No. 16764462.4, 13 pages.
Combined Chinese Office Action and Search Report dated Jan. 18, 2019 in Chinese Patent Application No. 201680016031.3 (with English translation), 18 pages.
International Search Report and Written Opinion dated May 24, 2016, in PCT/JP2016/001371 filed Mar. 11, 2016.

* cited by examiner

[Fig. 1A]
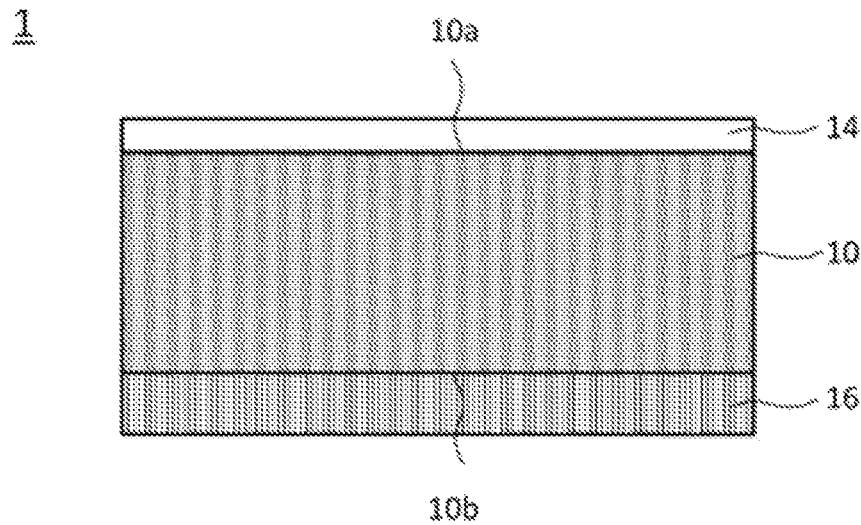
[Fig. 1B]
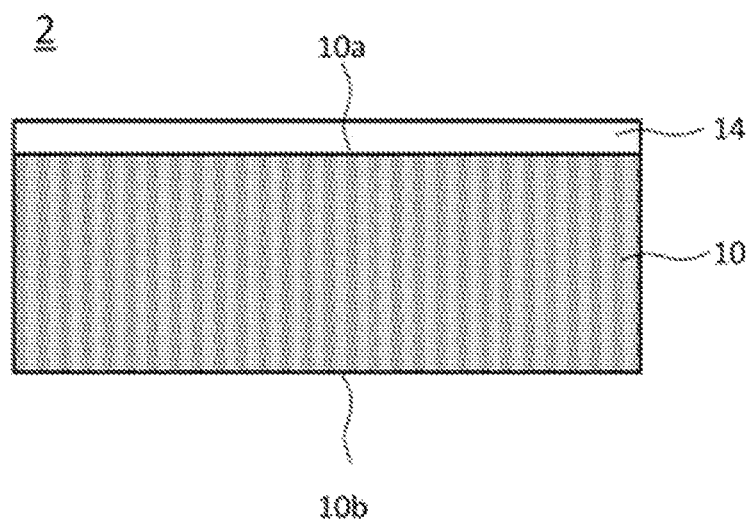
[Fig. 2A]
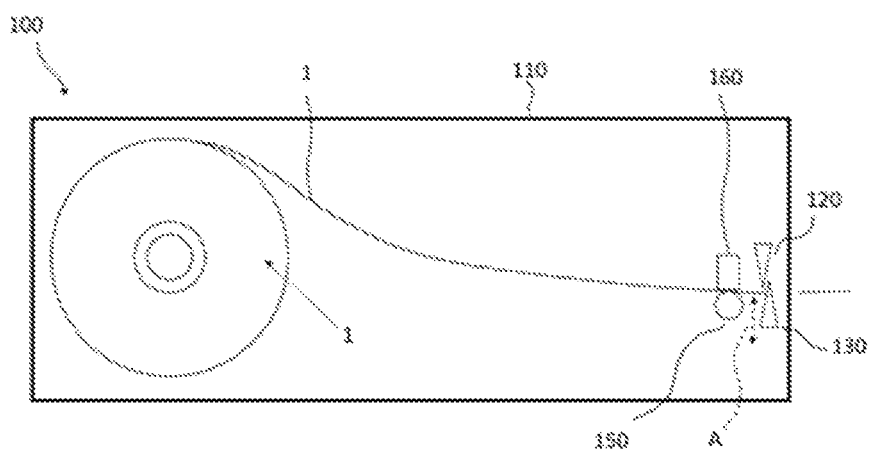

[Fig. 2B]
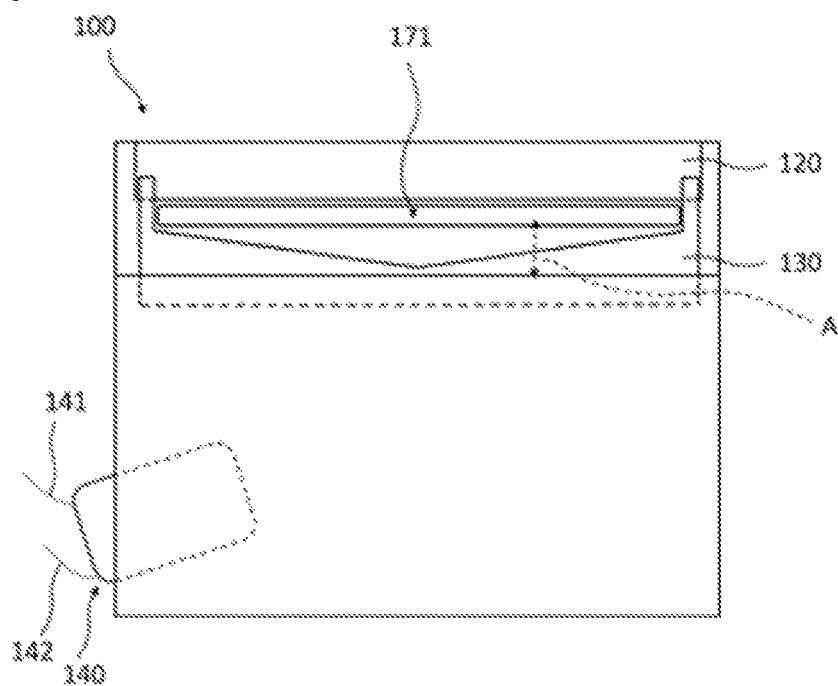
[Fig. 2C]
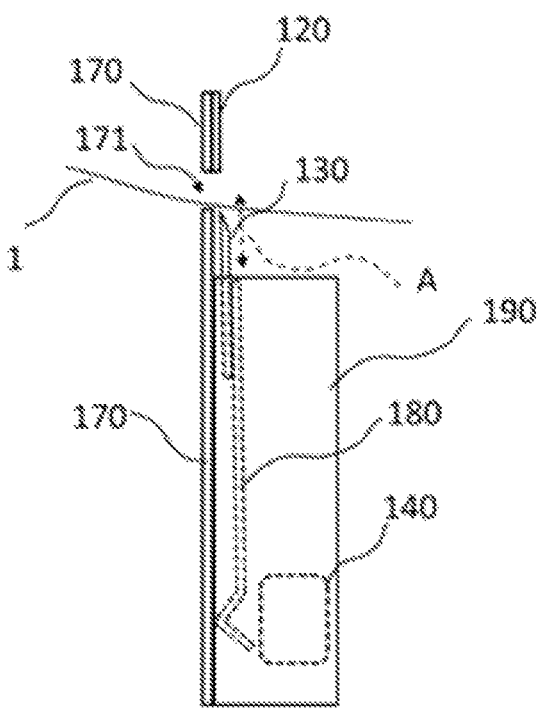

[Fig. 3A]
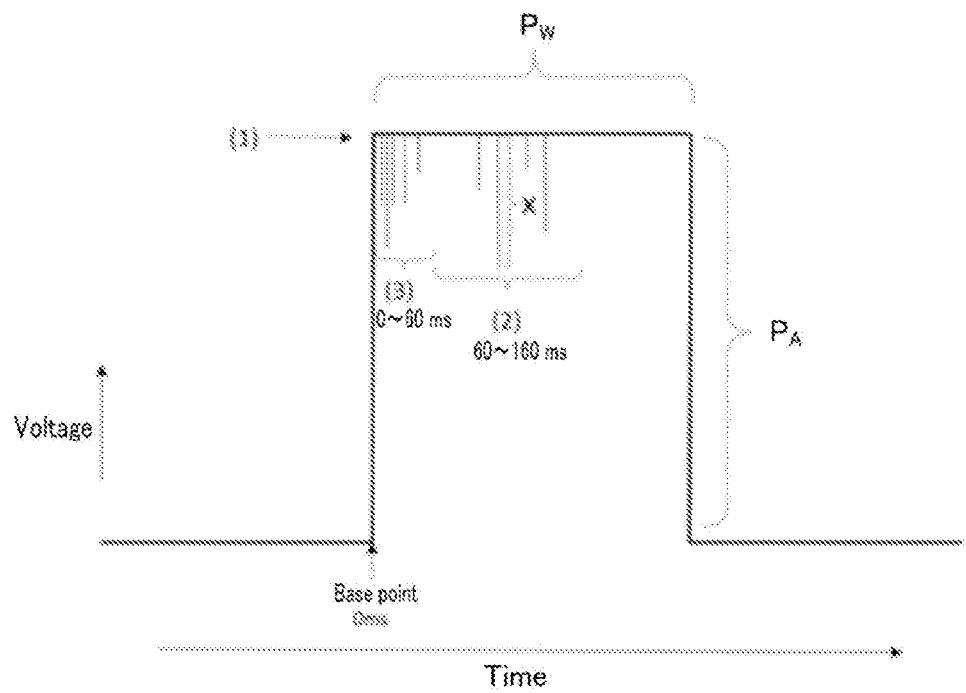
[Fig. 3B]
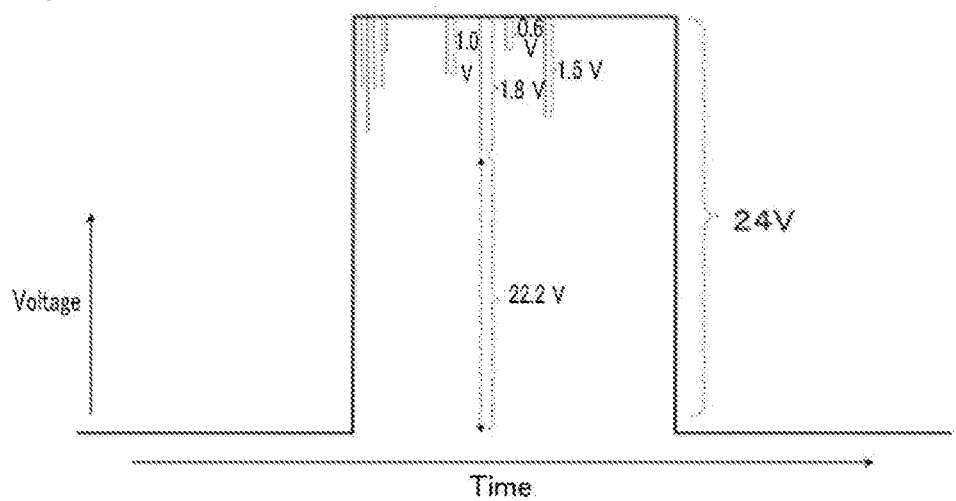

[Fig. 4A]
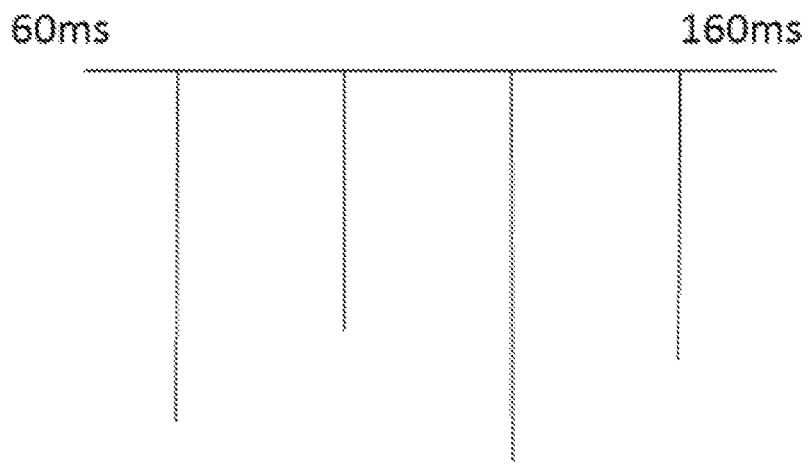

[Fig. 4B]
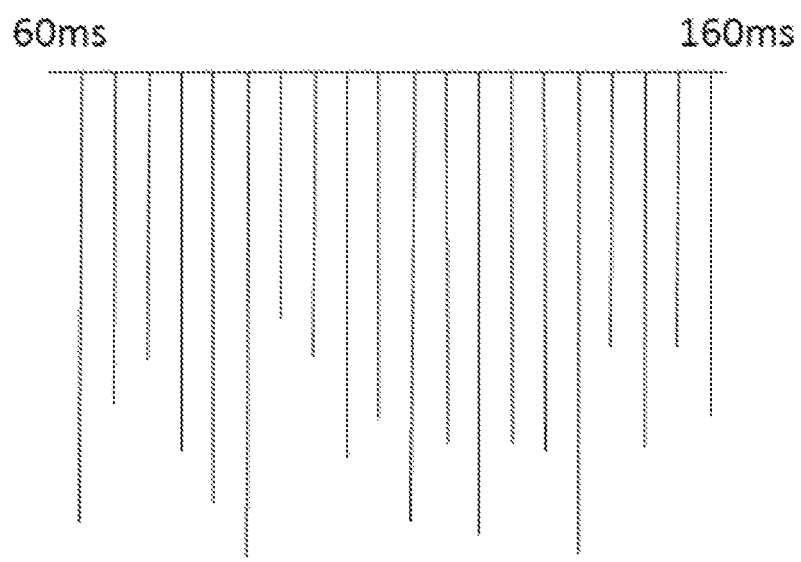

[Fig. 4C]
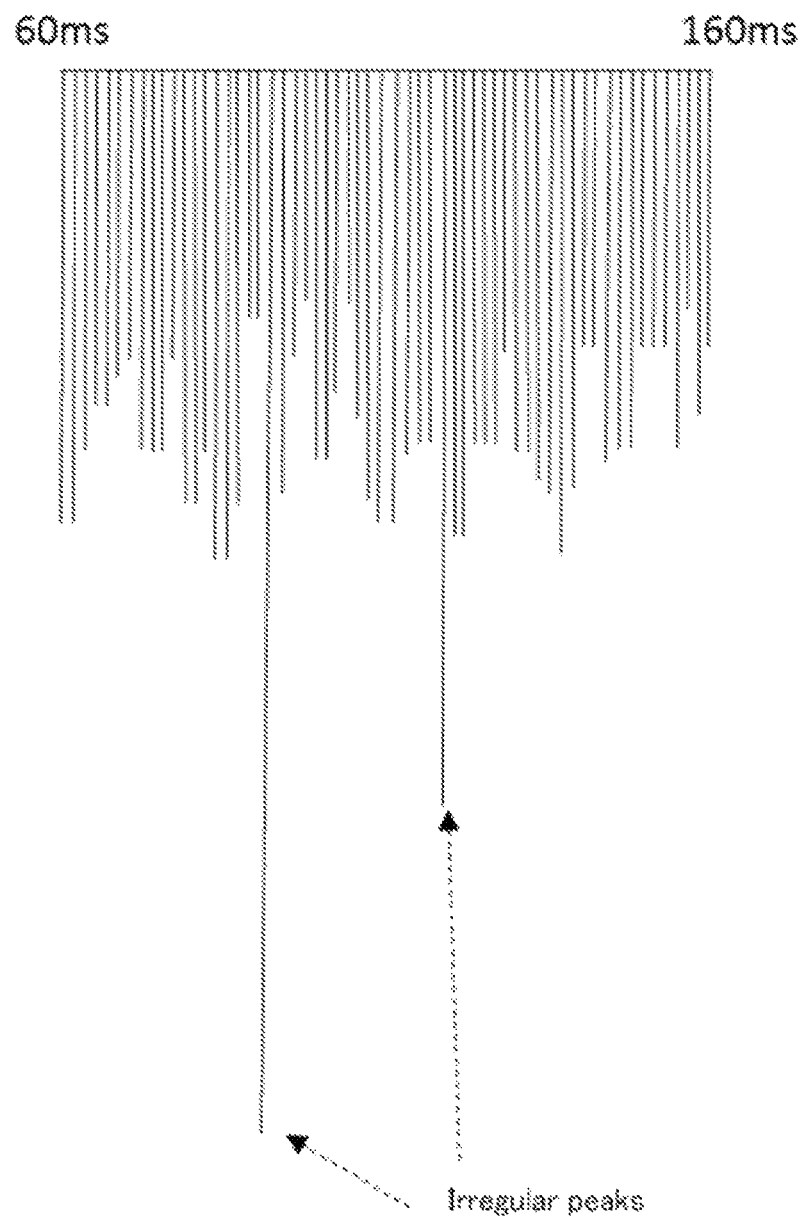
[Fig. 5]
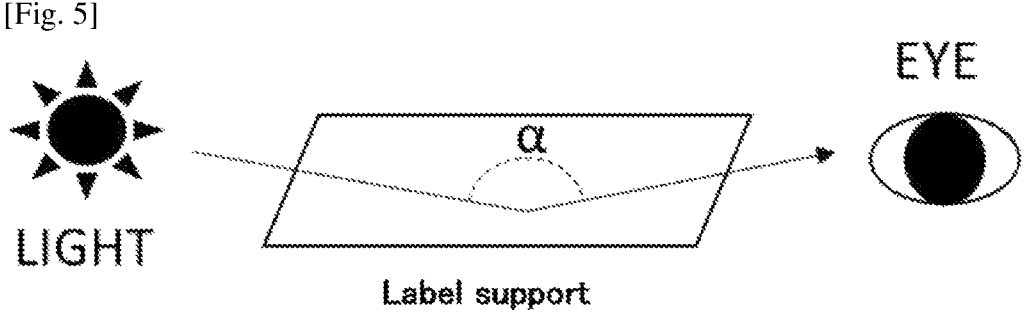

[Fig. 6A]
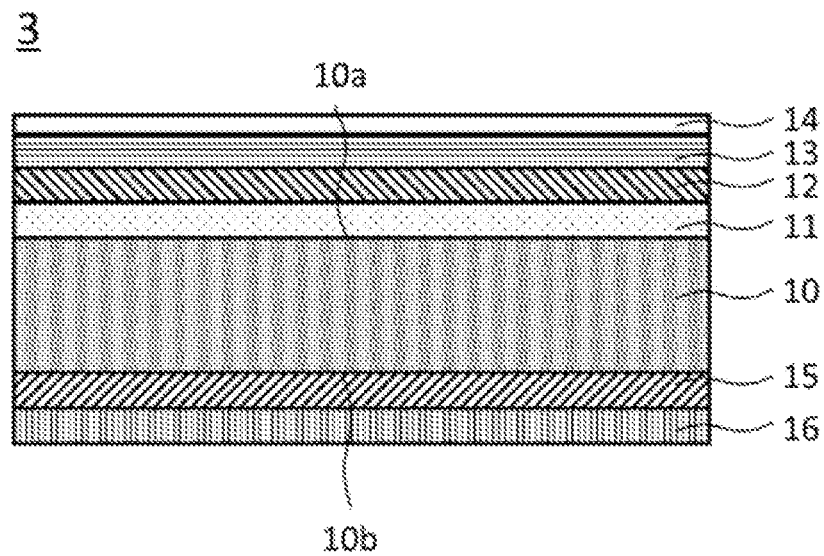
[Fig. 6B]
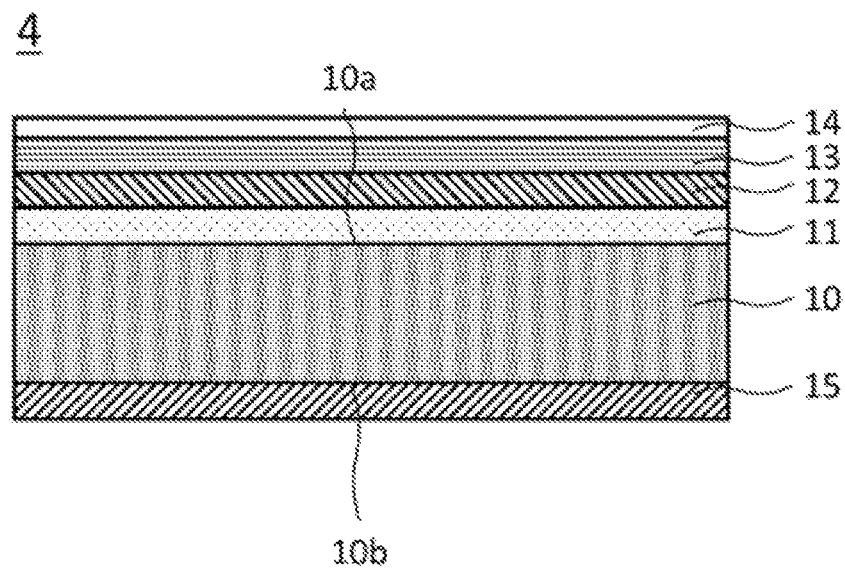

LINERLESS LABEL AND CUTTING APPARATUS

TECHNICAL FIELD

The present disclosure relates to linerless labels and cutting apparatuses.

BACKGROUND ART

In recent years, there have been increasing opportunities of using adhesive sheets for labels as labels such as labels for indicating prices, labels for indicating products (barcodes), labels for indicating qualities, labels for indicating measures, labels for advertisements (stickers), etc. There are many recording methods for performing recording over the labels, such as an inkjet recording method and a thermal recording method.

Hitherto, typical adhesive sheets having a configuration obtained by laminating an adhesive layer and a release paper over a surface of a label opposite to a surface over which information is recorded have been widely used because these sheets are easy to stick only by peeling the release paper and applying a pressure.

However, while adhesive sheets having the typical configuration are used by peeling the release paper, the peeled release paper have hardly been collected and recycled but have most often been disposed of.

Linerless labels, which are obtained by forming a release layer having releasability over a surface of the labels, can be used in a wound state without a release paper. This realizes roll-shaped linerless labels. Linerless labels include no release paper to be disposed of and can reduce environmental impacts.

Linerless labels are a continuous body. Therefore, linerless labels can be used as labels by being cut with a cutting apparatus having a cutter blade.

When linerless labels are cut with a cutting apparatus, the adhesive over the back surface of the labels adheres to and accumulates over the cutter blade and reduces the cuttability of the cutter blade. This gives rise to inconvenience of removing the adhesive that has adhered to the cutter blade, etc.

To overcome this inconvenience, there are proposed techniques for modifying not the linerless labels but a label printer apparatus to suppress adhesion of the adhesive to the cutter blade (see, e.g., PTLs 1 and 2). However, these techniques are for developing apparatuses and hence limit the printers that can be used.

There are also proposed techniques for applying the adhesive over the linerless labels in a pattern to form adhesive portions and non-adhesive portions in order for the non-adhesive portions to be cut to prevent adhesion of the adhesive (see, e.g., PTLs 3, 4, 5, and 6). However, these techniques use a special applying method and hence have a low productivity.

There is also proposed a technique for providing an applied layer containing a release agent such as a silicone-based polymeric compound over a to-be-cut portion of a base such that every time a linerless label is cut by the cutter blade, the edge of the blade is coated with the release agent contained in the applied layer at the eye mark for the to-be-cut portion to prevent adhesion of the adhesive (see, e.g., PTL 7). However, this technique needs to provide the eye-mark applied layer selectively at the to-be-cut portions beforehand. Therefore, when labels with a plurality of different printing lengths are to be issued from the same continuous label, there occurs inconvenience that an applied layer is not provided at a portion to be cut, etc.

As an example in which no such special fabrication as described above is applied to a to-be-cut portion, there is proposed a technique for a linerless label for thermal recording, wherein an undercoat layer, a thermosensitive color-developing layer, a barrier layer, and a release layer are laminated sequentially over one surface of a support of the linerless label and an adhesive layer is provided over another surface of the support (see, e.g., PTL 8). However, this technique applies the adhesive over a surface of the release layer, dries the adhesive, and winds up the layers in a roll shape to stick the release layer to the back surface of the thermal recording medium. Therefore, the adhesive remains over the release layer, leading to a problem that in cutting with a printer, cuttability of the printer sharply degrades and print image fading occurs frequently.

It is possible to reduce the amount of the adhesive to be applied over the linerless label to reduce adhesion of the adhesive to the cutter blade. However, this method reduces the adhesive force and makes the function as the label problematic.

As described above, when a linerless label is cut with a cutting apparatus, the adhesive over the back surface of the label adheres to and accumulates over the cutter blade. This causes label jamming or reduces cuttability of the cutter. When the linerless label is a linerless label for thermal recording and the cutting apparatus is a thermal recording apparatus including a feedback function, print image fading occurs if the adhesive having accumulated over the cutter blade moves and accumulates over a thermal head.

CITATION LIST

Patent Literature

PTL 1: Japanese Unexamined Patent Application Publication No. 2003-089247
PTL 2: Japanese Unexamined Patent Application Publication No. 11-000892
PTL 3: Japanese Unexamined Patent Application Publication No. 2007-212693
PTL 4: Japanese Unexamined Patent Application Publication No. 2013-029604
PTL 5: Japanese Unexamined Patent Application Publication No. 2011-007890
PTL 6: Japanese Unexamined Patent Application Publication No. 2007-171776
PTL 7: Japanese Unexamined Patent Application Publication No. 2000-284694
PTL 8: Japanese Unexamined Patent Application Publication No. 2013-121718

SUMMARY OF INVENTION

Technical Problem

The present invention has an object to provide a linerless label that is excellent in adhesiveness, suppresses accumulation of an adhesive over a cutter blade during cutting, and has the following two functions.

(1) A linerless label capable of suppressing jamming due to degradation of cuttability
(2) A linerless label capable of suppressing occurrence of print image fading

Solution to Problem

A linerless label of the present invention as means of realizing the object described above is a linerless label including a support, a release layer over one surface of the support, and an adhesive layer over another surface of the support. When the linerless label is cut with an apparatus including a mechanism in which an upper blade of cutter blades is immobilized and a lower blade of the cutter blades is configured to move upward, in a manner that the lower blade is inserted into the linerless label from a side of the linerless label at which the adhesive layer is provided, a cutter load voltage during a cutter operation performed after the linerless label is cut five thousand times repeatedly has a difference of less than or equal to 2.0 V from the cutter load voltage during cutting of a label support, which is the linerless label before treated to have adhesiveness.

Advantageous Effects of Invention

The present invention can provide a linerless label that is excellent in adhesiveness and is capable of suppressing accumulation of an adhesive over a cutter blade during cutting and suppressing occurrence of jamming and print image fading.

BRIEF DESCRIPTION OF DRAWINGS

FIG. 1A is a diagram illustrating an example of a layer configuration of a linerless label according to an embodiment.

FIG. 1B is a diagram illustrating an example of a layer configuration of a label support according to an embodiment.

FIG. 2A is a schematic diagram illustrating an example of an apparatus used for measuring a cutter load voltage.

FIG. 2B is a front view illustrating an example of an apparatus used for measuring a cutter load voltage.

FIG. 2C is an enlarged schematic diagram illustrating an example of a cutter unit of an apparatus used for measuring a cutter load voltage.

FIG. 3A is a depictive diagram for measuring a load voltage value for calculating a cutter load voltage.

FIG. 3B is a depictive diagram of a specific example of measuring a load voltage value for calculating a cutter load voltage.

FIG. 4A is a depictive diagram depicting a relationship between a sampling rate of an oscilloscope and detected peaks when the sampling rate is extremely lower than 2.5 MS/s.

FIG. 4B is a depictive diagram depicting a relationship between a sampling rate of an oscilloscope and detected peaks when the sampling rate is 2.5 MS/s.

FIG. 4C is a depictive diagram depicting a relationship between a sampling rate of an oscilloscope and detected peaks when the sampling rate is extremely higher than 2.5 MS/s.

FIG. 5 is a diagram depicting an observation method when judging completion of permeation in evaluation of a label support backside barrier property.

FIG. 6A is a diagram illustrating an example of a layer configuration of a linerless label for thermal recording according to an embodiment.

FIG. 6B is a diagram illustrating an example of a layer configuration of a label support for thermal recording according to an embodiment.

DESCRIPTION OF EMBODIMENTS

An embodiment of the present invention will be described below with reference to the drawings. The same constituting portions are denoted by the same reference signs in the diagrams, and redundant descriptions may be omitted.

(Basic Configuration of Linerless Label)

FIG. 1A is a diagram illustrating a basic configuration of a linerless label according to an embodiment. As illustrated in FIG. 1A, as a basic configuration, the linerless label 10 includes a release layer 14 over at least one surface 10a of a support 10 and an adhesive layer 16 over another surface 10b of the support 10. The linerless label 1 can be wound around a paper core in a roll shape in a state that, for example, the adhesive layer 16 faces the internal side.

When the linerless label 1 is cut under test conditions of 23±1 degrees Celsius and 50±2% RH with an apparatus including a mechanism in which an upper blade of cutter blades is immobilized and a lower blade of the cutter blades is configured to move upward, in a manner that the lower blade is inserted into the linerless label 1 from a side of the linerless label 1 at which the adhesive layer 16 is provided, a cutter load voltage during a cutter operation performed after the linerless label 1 is cut five thousand times repeatedly has a difference of less than or equal to 2.0 V from the cutter load voltage during cutting of a label support 2 before treated to have adhesiveness. The difference is preferably less than or equal to 1.5 V and more preferably less than or equal to 1.0 V. The "cutter load voltage" will be described below with reference to FIG. 3A and FIG. 3B.

As illustrated in FIG. 1B, the label support 2 mentioned above has a basic configuration obtained by removing the adhesive layer 16 from the configuration of the linerless label 1, and is identical with the configuration of the linerless label 1 in the other respects.

A cutter load voltage on the linerless label 1 is lower than a cutter load voltage on typical linerless labels (e.g., greater than or equal to 2.5 V). Therefore, a load applied on the cutter blades of the apparatus during cutting of the linerless label 1 can be reduced, and accumulation of the adhesive over the cutter blades during cutting of the linerless label 1 can be suppressed. This makes it possible to suppress occurrence of jamming and print image fading due to accumulation of the adhesive over the cutter blades and to reduce the frequency of removing the adhesive over the cutter blades.

An apparatus used for measuring the cutter load voltage, a method for measuring the cutter load voltage, a preferred embodiment of the linerless label 1, and Examples will be described below in order.

(Apparatus Used for Measuring Cutter Load Voltage)

FIG. 2A to FIG. 2C are diagrams depicting an apparatus used for measuring the cutter load voltage. FIG. 2A is a cross-sectional view, FIG. 2B is a front view, and FIG. 2C is a detailed cross-sectional view of a cutter unit. As illustrated in FIG. 2A to FIG. 2C, the apparatus 100 used for measuring the cutter load voltage is configured to be capable of housing the linerless label 1 wound in a roll shape inside a housing 110, and has at least a function for cutting the linerless label 1. The apparatus 100 may further have a function for performing printing over the linerless label 1. The following description will be provided for an example case where the apparatus 100 has the printing function and the cutting function.

The apparatus 100 includes a mechanism in which two cutter blades are provided above and below the linerless label 1 and the upper blade 120 is immobilized and the lower blade 130 is configured to move upward. To be more specific, the upper blade 120 is immobilized on a cutter unit base 170, and the lower blade 130 has a V shape in a front view and is attached to the cutter unit base 170 via a lower-blade attaching jig 180. The lower blade 130 is not secured to the lower-blade attaching jig 180, and is configured to be capable of making a reciprocating motion by the lower-blade attaching jig 180 being slid in a direction of an arrow A (i.e., a vertical direction) under a driving force of a motor 140.

The linerless label 1 can be conveyed from inside the housing 110 in a predetermined direction by a conveying unit 150, and is ejected through an ejecting port 171 above the cutter unit base 170. At the time, the adhesive layer 16 is disposed to face the lower blade 130. Therefore, the linerless label 1 is cut by the lower blade 130 being inserted from a side of the linerless label 1 at which the adhesive layer 16 is provided. To be more specific, upon application of a pulse voltage across terminals 141 and 142 of the motor 140, the lower blade 130 moves in the direction of the arrow A to cut the linerless label 1 nipped between the upper blade 120 and the lower blade 130, and then returns to the original position.

A thermal head 160 is a head configured to perform printing over the linerless label 1 when the linerless label 1 is in the form of a linerless label 3 for thermal recording including a thermal recording layer as described below.

HALLO NEO-7 H23T (printer) available from Shinsei Industries Co., Ltd. may be used as the apparatus 100. However, any other apparatus that has compatibility of measured values (cutter load voltage) with the mentioned apparatus may also be used. The printing function is not indispensable, but the cutting function is the requisite minimum.

(Method for Measuring Cutter Load Voltage)

A specific method used in cutting with the apparatus 100 in order to measure a difference (hereinafter may be referred to as ΔV(ave)) between the cutter load voltage during cutting of the label support 2 and the cutter load voltage during a cutter operation performed after the linerless label 1 is cut five thousand times repeatedly will be described. Note that the waveforms illustrated in FIG. 3A, FIG. 3B, and FIG. 4A to FIG. 4C are merely notional diagrams for depicting the measuring method and the number of peaks illustrated in the diagrams is different from the number in actual waveforms.

With the apparatus 100, it is possible to measure the voltage across the terminals 141 and 142 of the motor 140 during cutting, by coupling a probe of an oscilloscope to the terminals 141 and 142. WAVERUNNER LT584L available from LeCroy Corporation may be used as the oscilloscope. However, any other apparatus that has compatibility of with the mentioned apparatus may also be used. Here, a ground line of the probe is coupled to one of the aforementioned terminals at a lower electric potential side and a spring hook is coupled to another of the aforementioned terminals at a higher electric potential side, so that an upwardly convex pulse waveform as illustrated in FIG. 3A may be displayed on the oscilloscope when the motor is driven in cutting.

The oscilloscope WAVERUNNER LT584L available from LeCroy Corporation is set to a sampling rate of 2.5 MS/s, to a sensitivity of 200 mV, and to DC coupling. When any other oscilloscope is used, the oscilloscope is set to equivalent levels to those described above.

Specifically, in a state that the probe is coupled between the terminals 141 and 142, the linerless label 1 is issued by an amount corresponding to one piece, and the lower blade 130 is moved upward to cut the linerless label 1. Change of the voltage across the terminals 141 and 142 of the motor 140 during the cutting appears on the oscilloscope as, for example an upwardly convex pulse waveform illustrated in FIG. 3A (in this case, with a pulse amplitude $P_A$=24 V).

Here, a plurality of downward peaks are observed all across a pulse width $P_w$ at a maximum amplitude portion (1) in FIG. 3A. These peaks represent voltages having attenuated from the maximum amplitude portion (24 V) as a result of a load being applied on the cutter portion during the cutting. A plurality of downward peaks (3) are observed intensively in a range of from 0 ms through 60 ms as counted from a base point (0 ms) that is set at the rising portion of the pulse amplitude $P_A$. These peaks represent load voltages during gear meshing in the motor 140, and do not represent load voltages applied to the cutter portion during cutting. Hence, a value (X) representing the maximum voltage value attenuation among the plurality of downward peaks (2) in the range of from 60 ms through 160 ms of the pulse width $P_w$ except the plurality of intensive downward peaks (3) in the range of from 0 ms through 60 ms is read.

The value (X) representing the maximum voltage value attenuation among the plurality of downward peaks (2) in the range of from 60 ms through 160 ms of the pulse width $P_w$ except the plurality of downward peaks (3) intensively present in the range of from 0 ms through 60 ms as counted from the base point (0 ms) set at the rising portion of the pulse amplitude $P_A$ is referred to as "load voltage value".

FIG. 3B illustrates a specific example of a waveform. When HALLO NEO-7 H23T (printer) available from Shinsei Industries Co., Ltd. is used as the apparatus 100, the pulse amplitude $P_A$ is 24 V. For example, when a waveform as illustrated in FIG. 3B appears, a value representing the maximum voltage value attenuation among a plurality of downward peaks in a range of from 60 ms through 160 ms of the pulse width $P_w$ except a plurality of downward peaks intensively present in a range of from 0 ms through 60 ms as counted from a base point (0 ms) set at the rising portion of the pulse amplitude $P_A$ is 1.8 V. Therefore, in this case, the load voltage value is 1.8 V.

The reason why the sampling rate is set to 2.5 MS/s will be described. In the first place, the present experiment is intended for finding an average value of a plurality of downward peaks detected in a range of from 60 ms through 160 ms of the pulse width $P_w$. However, an operation of reading the values of all of a plurality of downward peaks observed and calculating an average of these values takes a great effort and is not preferable as a testing method. Hence, in the present experiment, only the value representing the maximum voltage value attenuation among the detected downward peaks is read as described above and positioned as a representative value in the range of from 60 ms through 160 ms of the pulse width $P_w$.

In this context, what is important is the sampling rate. FIG. 4A to FIG. 4C illustrate notional diagrams of a sampling rate and detected downward peaks. When the sampling rate is extremely lower than 2.5 MS/s, too few peaks are detected as illustrated in FIG. 4A and data reliability is poor. On the other hand, when the sampling rate is extremely higher than 2.5 MS/s, all peaks including irregular peaks are detected as illustrated in FIG. 4C. Therefore, when the value representing the maximum voltage value attenuation among the plurality of downward peaks in the range of from 60 ms through 160 ms of the pulse width $P_w$ detected under this setting is read, the read value significantly gaps from values constituting the overall trend in that range. As a result of various studies, it has turned out that when the sampling rate is set to 2.5 MS/s, a sufficient number of data can be acquired and substantially no irregular peaks are detected. The present sampling rate condition is concluded as a result of the inference that when the value representing the maximum voltage value attenuation among the plurality of downward peaks in the range of from 60 ms through 160 ms of the pulse width $P_w$ detected under this setting is read, the read value is the representative value of the range.

Notwithstanding the above said, even when the sampling rate is set to 2.5 MS/s, there are some cases when irregular peaks are detected. Hence, as described below, the load voltage value is measured twenty times for measuring one data and the measured values are averaged, as a skill for eliminating the influence of the irregular peaks.

A specific operation for calculating DV(ave) will be described below. For calculation of $\Delta V$(ave), there is a need of measuring the cutter load voltage (referred to as $\Delta V_{base}$(ave)) during cutting of the label support 2 and the cutter load voltage (referred to as $\Delta V_{label}$(ave)) during a cutter operation performed after the linerless label 1 is cut five thousand times repeatedly.

For measurement of $\Delta V_{base}$(ave) and $\Delta V_{label}$(ave), first, each of the linerless label 1 (with a width of 60 mm±1 mm), the label support 2 (with a width of 60 mm±1 mm), and the apparatus 100 is left to stand still under conditions of 23±1 degrees Celsius and 50±2% RH for longer than or equal to 4 hours for humidity conditioning. Here, any contamination over the cutter blades is cleaned beforehand.

Then, the cutter load voltage during blank cutting before cutting is measured. Specifically, in a blank cutting state in which nothing is set inside the apparatus 100, the lower blade 130 is moved, to measure the load voltage value during twenty times of blank cutting with an oscilloscope. An average of the twenty measured values is referred to as $V_{label0}$(ave).

Next, the linerless label 1 is set inside the apparatus 100, and an operation of cutting the linerless label 1 in a manner to move the lower blade 130 and insert the lower blade 130 into the linerless label 1 from a side of the linerless label 1 at which the adhesive layer is provided is repeated five thousand times. Then, in the state that the linerless label 1 is set, cutting of the linerless label 1 in a manner to move the lower blade 130 and insert the lower blade 130 into the linerless label 1 from a side of the linerless label 1 at which the adhesive layer is provided is performed to measure the load voltage value during cutting performed after the five thousand times of cutting. This measurement is conducted twenty times. An average of the twenty measured values is referred to as $V_{label5000}$(ave). Then, $\Delta V_{label}$(ave)=$V_{label5000}$(ave)-$V_{label0}$(ave), which is a formula (1), is calculated.

After $\Delta V_{label}$(ave) is measured, the linerless label 1 is detached from the apparatus 100, and any contamination over the cutter blades is cleaned. Next, the load voltage value during blank cutting before cutting is again measured. Specifically, in a blank cutting state in which nothing is set inside the apparatus 100, the lower blade 130 is moved, to measure the load voltage value during twenty times of blank cutting with an oscilloscope. An average of the twenty measured values is referred to as $V_{base0}$(ave).

Next, the label support 2 is set inside the apparatus 100, and in this state, the load voltage value during cutting of the label support 2 in a manner to move the lower blade 130 and insert the lower blade 130 into the label support 2 from a surface of the label support 2 over which the release layer is not provided is measured. This measurement is conducted twenty times. An average of the twenty measured values is referred to as $V_{base}$(ave). Then, $\Delta V_{base}$(ave)=$V_{base}$(ave)-$V_{base0}$(ave), which is a formula (2), is calculated.

Then, $\Delta V$(ave)=$\Delta V_{label}$(ave)-$\Delta V_{base}$(ave), which is a formula (3), is calculated.

In the procedure described above, $\Delta V_{base}$(ave) is measured after $\Delta V_{label}$(ave) is measured. However, which of $\Delta V_{label}$(ave) and $\Delta V_{base}$(ave) may be measured first. However, there is a need of cleaning any contamination over the cutter blades once after either one is measured, as described above. After the cleaning, it is important to measure $V_{label0}$(ave) or $V_{base0}$(ave) immediately before measuring $V_{label5000}$(ave) or $V_{base}$(ave).

Materials, etc. of each layer of the linerless label 1 according to the present invention are adjusted such that $\Delta V$(ave) calculated according to the formula (3) necessarily becomes less than or equal to 2.0 V (preferably less than or equal to 1.5 V, and more preferably less than or equal to 1.0 V). Preferable examples of the materials, etc. will be described below.

For the measurement of the cutter load voltage, there is a need of using the apparatus 100, which is a standard, or any other apparatus having compatibility of measured values with the apparatus 100. When it is not intended to measure the cutter load voltage, the linerless label 1 may be cut with any other cutting apparatus. A cutting apparatus used for cutting the linerless label 1 needs only to have at least one cutter blade, but preferably includes two or more cutter blades to be configured as a mechanism capable of cutting the linerless label 1 both from above and from below.

The cutting apparatus may have any of a mechanism configured to insert the blade from a side of the support 10 at which the adhesive layer 16 is provided and a mechanism configured to insert the blade from a side of the support 10 at which the release layer 14 is provided. When the cutting apparatus includes two or more blades above and below the linerless label 1, the cutting apparatus may have any of a mechanism in which the upper blade is immobilized and the lower blade is configured to move upward, a mechanism in which the lower blade is immobilized and the upper blade is configured to move downward, and a mechanism in which both of the upper blade and the lower blade are configured to move. When the continuous body of the linerless label 1 is cut with any of these mechanisms, a single label piece can be formed.

As described above, the label support 2 has a configuration obtained by removing the adhesive layer 16 from the configuration of the linerless label 1, and is identical with the linerless label 1 in the other respects. The linerless label 1 can be produced by directly applying an adhesive over a surface of the label support 2 opposite to the surface over which the release layer 14 is provided and drying the adhesive to form the adhesive layer 16, or can be produced by applying an adhesive over a base having releasability, drying the adhesive, transferring the adhesive to a surface of the label support 2 over which the release layer 14 is not provided, and then peeling only the base to form the adhesive layer 16.

In order that the linerless label 1 produced by directly applying an adhesive over the label support 2 and drying the adhesive to form the adhesive layer 16 may result in a cutter load voltage $\Delta V$(ave) of less than equal to 2.0 V when measured with the apparatus 100 according to the measuring method described above, there is a need of suppressing any undried adhesive from permeating the label support 2 when the adhesive is applied.

As a result of various studies, it is found possible to suppress permeation of any undried adhesive into the label support 2 and obtain the $\Delta V$(ave) value of less than or equal to 2.0 V, when in a label support backside barrier property test of the label support 2 using a wet reagent having a surface tension of 34 mN/m, the wet reagent takes longer than or equal to 20 seconds to complete permeating the label support. The ΔV(ave) value is less when longer than or equal to 30 seconds is taken, and is even less when longer than or equal to 40 seconds is taken.

(Measuring Method in Label Support Backside Barrier Property Test)

With a wire bar, a wet reagent having a surface tension of 34 mN/m is applied in an attached amount of 11.5±1.0 g/m² over a surface of the label support 2 over which the release layer is not provided, over an area of (50±1 mm)×(50±1 mm). A time taken for the wet reagent to complete permeating the area of the mentioned range from immediately after the wet reagent is applied is measured. The barrier property is higher when the time taken is longer.

The criterion for judging completion of permeation of the wet reagent in the above-described measurement of the label support backside barrier property will be described. From immediately after the wet reagent is applied over the surface of the label support over which the release layer is not provided, the wet-reagent-applied surface (i.e., the surface of the label support over which the release layer is not provided) is observed in a state that, as illustrated in FIG. 5, the positional relationship among a lighting apparats such as a fluorescent lamp, the label support (which is placed to turn the wet-reagent-applied surface upward), and an eye is set such that the angle a in FIG. 5 is in a range of from 120 degrees through 150 degrees. Permeation is judged to have completed when gloss generated as a result of application of the wet reagent has completely disappeared.

In order for the whole amount of the wet reagent to take longer than or equal to 20 seconds to permeate the label support 2 as described above, a backside barrier layer 15 described below may be provided over the surface of the label support 2 opposite to the surface over which the release layer 14 is provided.

The label support 2 for measurement of the cutter load voltage and the label support backside barrier property described above may be an intermediate product in the process of producing the linerless label 1, i.e., the product before the adhesive layer is applied, or a product obtained by peeling only the adhesive layer with a solvent or the like after the lineless label 1 is produced.

(Preferred Embodiment of Linerless Label 1)

The basic configuration of the linerless label 1 according to the present embodiment is as illustrated in FIG. 1A. It is possible to realize various types of linerless labels by adding various layers to the basic configuration illustrated in FIG. 1A. Here, a linerless label for thermal recording will be presented as an example of the preferred embodiment of the linerless label 1.

FIG. 6A illustrates a layer configuration when the linerless label according to the present embodiment is used as a linerless label for thermal recording. As illustrated in FIG. 6A, a linerless label 3 for thermal recording includes an undercoat layer 11, a thermosensitive color-developing layer 12, a protective layer 13, and a release layer 14 that are laminated in order over one surface 10a of a support 10, an adhesive layer 16 over another surface 10b of the support 10, and a backside barrier layer 15 between the adhesive layer 16 and the support 10 for suppressing permeation of the adhesive layer 16 into the support 10. The backside barrier layer 15, the undercoat layer 11, and the protective layer 13 may be provided as needed. The linerless label 3 for thermal recording can be wound around a paper core in a roll shape in a state that, for example, the adhesive layer 16 faces the internal side.

When measured with the apparatus 100 according to the measuring method described above, the linerless label 3 for thermal recording has a cutter load voltage ΔV(ave) of less than or equal to 2.0 V. However, the difference between the averages is preferably less than or equal to 1.5 V and more preferably less than or equal to 1.0 V. The label support used when the above-described measurement is conducted on the linerless label 3 for thermal recording is a label support 4 for thermal recording illustrated in FIG. 6B. The label support 4 for thermal recording is obtained by removing only the adhesive layer 16 from the linerless label 3 for thermal recording, and is identical with the configuration of the linerless label 3 for thermal recording in any other respects.

Preferred conditions of the respective layers in order for the linerless label 3 for thermal recording to result in ΔV(ave) of less than or equal to 2.0 V when measured with the apparatus 100 according to the measuring method described above will now be described.

<Backside Barrier Layer>

Examples of a resin contained in the backside barrier layer 15 include polyvinyl alcohol, starch and derivatives of starch, cellulose derivatives such as methoxy cellulose, hydroxyethyl cellulose, carboxy methyl cellulose, methyl cellulose, and ethyl cellulose, sodium polyacrylate, polyvinyl pyrrolidone, polyacrylamide, sodium alginate, gelatin, casein, an acrylic acid ester copolymer, a styrene/butadiene/acrylic-based copolymer, a styrene/acrylic acid ester copolymer, a natural rubber-based resin, a styrene/butadiene copolymer, an acrylonitrile/butadiene copolymer, a methyl methacrylate butadiene copolymer, a polychloroprene-based resin, a vinyl acetate-based resin, an ethylene/vinyl acetate-based resin, a polyolefin-based resin, a urea resin, a melamine resin, and a polyurethane resin. One of these may be used alone, or two or more of these may be used in combination.

Among these resins, those that have a SP value of greater than or equal to 8.0 but less than or equal to 10.6 are preferable in the case of applying an undried adhesive directly over the backside barrier layer 15. Preferable examples of such resins include an acrylic acid ester copolymer emulsion, a styrene/butadiene/acrylic-based copolymer, a styrene/acrylic acid ester copolymer, a natural rubber-based resin, a styrene/butadiene copolymer, an acrylonitrile/butadiene copolymer, a polychloroprene-based resin, a vinyl acetate-based resin, an ethylene/vinyl acetate-based resin, a polyolefin-based resin, a melamine resin, and a polyurethane resin. A resin having a SP value of less than 8.0 has a poor bindability with the adhesive layer. A resin having a SP value of greater than 10.6 cannot suppress permeation of an undried adhesive into the label support.

Among these resins, it is preferable to use an acrylic acid ester copolymer, a styrene/butadiene/acrylic-based copolymer, a styrene/acrylic acid ester copolymer, a natural rubber-based resin, a styrene/butadiene copolymer, an acrylonitrile/butadiene copolymer, polychloroprene, ethylene/vinyl acetate, and a polyolefin-based resin.

Among these, it is further preferable to use an acrylic acid ester copolymer, a styrene/butadiene/acrylic-based copolymer, a styrene/acrylic acid ester copolymer, and a styrene/butadiene copolymer. Furthermore, a styrene/acrylic acid ester copolymer and a styrene/butadiene copolymer are particularly preferable.

A glass transition temperature (Tg) of the resin contained in the backside barrier layer 15 is preferably in a range of from minus 10 degrees Celsius through 100 degrees Celsius. A resin having Tg of lower than minus 10 degrees Celsius is softened at room temperature and comes to have properties close to the properties of the adhesive. This increases the load on the cutters. On the other hand, a resin having Tg of higher than 100 degrees Celsius undergoes excessive hardening at room temperature and may crack the backside barrier layer 15. Therefore, the backside barrier layer 15 cannot endure as a layer to cause permeation of the adhesive. Further, Tg is more preferably in a range of from 0 degree Celsius through 90 degrees Celsius.

A weight of the resin contained in the backside barrier layer 15 after dried is preferably greater than or equal to 0.5 g/m$^2$ but less than or equal to 5.0 g/m$^2$. When the weight after dried is less than 0.5 g/m$^2$, the resin cannot form a layer over the another surface 10b of the support 10. Therefore, the barrier function is degraded, and the adhesive permeates the support 10. This increases the load on the cutters. On the other hand, when the weight after dried is greater than 5.0 g/m$^2$, the barrier ability is saturated.

The backside barrier layer 15 may contain a filler such as kaolin and aluminium hydroxide in order to improve applicability and prevent blocking with the protective layer 13 during production of the linerless label 3 for thermal recording. Other than these, inorganic fillers or organic fillers given below may be used.

Examples of inorganic fillers include carbonate, silicate, a metal oxide, and a sulfated compound. Examples of organic fillers include a silicone resin, a cellulose resin, an epoxy resin, a nylon resin (Registered Trademark), a phenol resin, a polyurethane resin, a urea resin, a melamine resin, a polyester resin, a polycarbonate resin, a styrene-based resin, an acrylic-based resin, a polyethylene resin, a formaldehyde-based resin, and a polymethyl methacrylate resin.

<Release Layer>

A release agent may be used as the release layer 14. Examples of the release agent used as the release layer 14 include an ultraviolet-ray-curable silicone, a thermosetting silicone, a solventless silicone, a solvent-based silicone, an emulsion silicone, and a fluorine-based release agent.

<Protective Layer>

In the linerless label 3 for thermal recording, it is preferable that the protective layer 13 be further provided over the thermosensitive color-developing layer 12. With the protective layer 13, the thermosensitive color-developing layer 12 can be prevented from being adversely influenced by a color-development inhibiting factor in the linerless label 3 for thermal recording, which is typically stored or used in a roll shape. On the other hand, without the protective layer 13 over the thermosensitive color-developing layer 12, a sufficient barrier property cannot be obtained. This forms a factor of degrading color developability depending on the conditions for use.

The protective layer 13 may be a layer mainly made of a polyvinyl alcohol resin and a filler. The polyvinyl alcohol resin may contain, in addition to a saponified product of polyvinyl acetate produced according to, for example, a known method, a monomer that can be copolymerized with any other vinyl ester. Examples of such a monomer include olefins such as ethylene, propylene, and isobutylene, unsaturated acids such as an acrylic acid, a methacrylic acid, a crotonic acid, a maleic acid, maleic anhydride, and an itaconic acid or salts of the unsaturated acids, nitriles such as acrylonitrile and methacrylonitrile, amides such as acrylamide and methacrylamide, and olefin sulfonic acids such as an ethylene sulfonic acid, allyl sulfone, and a methallyl sulfonic acid or salts of the olefin sulfonic acids.

Examples of the filler include inorganic fillers such as a phosphate fiber, potassium titanate, acicular magnesium hydroxide, whisker, talc, mica, glass flake, calcium carbonate, plate-like calcium carbonate, aluminium hydroxide, plate-like aluminium hydroxide, silica, clay, kaolin, calcined clay, and hydrotalcite, and organic fillers such as a cross-linked polystyrene resin, a urea resin, a silicone resin, a cross-linked polymethyl methacrylate resin, and a melamine-formaldehyde resin.

It is particularly preferable that the protective layer 13 contain a water resistant additive in combination in order to have an improved water resistance. Specific examples of the water resistant additive include glyoxal, a melamine-formaldehyde resin, a polyamide resin, and a polyamide-epichlorohydrin resin.

The protective layer 13 may contain auxiliary additives hitherto used, such as a surfactant, a thermally fusible substance, a lubricant, and a pressure coloring inhibitor in combination with the resin and the filler. In this case, specific examples of the thermally fusible substance include those that are to be raised as examples of the thermosensitive color-developing layer described below.

An attached amount of the protective layer 13 is preferably in a range of from 1.0 g/m$^2$ through 5.0 g/m$^2$ after dried. When the attached amount is less than 1.0 g/m$^2$, storage stability of a recorded image will be degraded due to water and an acidic constituent substance contained in foods and a plasticizer, fats and oils, etc. contained in organic polymeric materials used for packing materials. When the attached amount is greater than 5.0 g/m$^2$, a color-developing sensitivity is poor.

<Thermosensitive Color-Developing Layer>

The thermosensitive color-developing layer 12 preferably contains a leuco dye and a developer, and preferably further contains other components as needed.

—Leuco Dye—

Leuco dyes are compounds that exhibit an electron-donating property, and used alone or as a mixture of two or more kinds. Leuco dyes are colorless or hypochromic dye precursors. Arbitrary known leuco dyes may be used without any limitation. Preferable examples of the leuco dyes include triphenylmethane phthalide-based, triallylmethane-based, fluoran-based, phenothiazine-based, thiofluoran-based, xanthene-based, indophthalyl-based, spiropyran-based, azaphthalide-based, chromenopyrazol-based, methine-based, rhodamine anilinolactam-based, rhodamine lactam-based, quinazoline-based, diazaxanthene-based, and bislactone-based leuco compounds.

Specific examples of the leuco compounds include 3-dibutylamino-6-methyl-7-anilinofluoran, 6-[ethyl(4-methylphenyl)amino]-3-methyl-2-anilinofluoran, 2-anilino-3-methyl-6-diethylamino fluoran, 2-anilino-3-methyl-6-(di-n-butylamino)fluoran, 2-anilino-3-methyl-6-(N-n-propyl-N-methylamino)fluoran, 2-anilino-3-methyl-6-(N-isopropyl-N-methylamino)fluoran, 2-anilino-3-methyl-6-(N-isobutyl-N-methylamino)fluoran, 2-anilino-3-methyl-6-(N-n-amyl-N-methylamino)fluoran, 2-anilino-3-methyl-6-(N-s-butyl-N-ethylamino)fluoran, 2-anilino-3-methyl-6-(N-n-amyl-N-ethylamino)fluoran, 2-anilino-3-methyl-6-(N-iso-amyl-N-ethylamino)fluoran, 2-anilino-3-methyl-6-(N-cyclohexyl-N-methylamino)fluoran, 2-anilino-3-methyl-6-(N-ethyl-p-toluidino)fluoran, 2-anilino-3-methyl-6-(N-methyl-p-toluidino)fluoran, 2-(m-trichloromethyl anilino)-3-methyl-6-diethylamino fluoran, 2-(m-trifluoromethyl anilino)-3-methyl-6-diethylamino fluoran, 2-(m-trifluoromethyl anilino)-3-methyl-6-(N-cyclohexyl-N-methylamino)fluoran, 2-(2,4-dimethylanilino)-3-methyl-6-diethylamino fluoran, 2-(N-ethyl-p-toluidino)-3-methyl-6-(N-ethyl anilino) fluoran, 2-(N-methyl-p-toluidino)-3-methyl-6-(N-propyl-p-toluidino)fluoran, 2-anilino-6-(N-n-hexyl-N-ethylamino)

fluoran, 2-(o-chloroanilino)-6-diethylamino fluoran, 2-(o-bromoanilino)-6-diethylamino fluoran, 2-(o-chloroanilino)-6-dibutylamino fluoran, 2-(o-fluoroanilino)-6-dibutylamino fluoran, 2-(m-trifluoromethyl anilino)-6-diethylamino fluoran, 2-(p-acetyl anilino)-6-(N-n-amyl-N-n-butylamino)fluoran, 2-benzylamino-6-(N-ethyl-p-toluidino)fluoran, 2-benzylamino-6-(N-methyl-2,4-dimethyl anilino)fluoran, 2-benzylamino-6-(N-ethyl-2,4-dimethyl anilino)fluoran, 2-dibenzylamino-6-(N-methyl-p-toluidino)fluoran, 2-dibenzylamino-6-(N-ethyl-p-toluidino)fluoran, 2-(di-p-methyl benzylamino)-6-(N-ethyl-p-toluidino)fluoran, 2-(alpha-phenyl ethylamino)-6-(N-ethyl-p-toluidino)fluoran, 2-methylamino-6-(N-methyl anilino)fluoran, 2-methylamino-6-(N-ethyl anilino)fluoran, 2-methylamino-6-(N-propyl anilino)fluoran, 2-ethylamino-6-(N-methyl-p-toluidino)fluoran, 2-methylamino-6-(N-methyl-2,4-dimethyl anilino)fluoran, 2-ethylamino-6-(N-methyl-2,4-dimethyl anilino)fluoran, 2-dimethylamino-6-(N-methyl anilino)fluoran, 2-dimethylamino-6-(N-ethyl anilino)fluoran, 2-diethylamino-6-(N-methyl-p-toluidino)fluoran, 2-diethylamino-6-(N-ethyl-p-toluidino)fluoran, 2-dipropylamino-6-(N-methyl anilino)fluoran, 2-dipropylamino-6-(N-ethyl anilino)fluoran, 2-amino-6-(N-methyl anilino)fluoran, 2-amino-6-(N-ethyl anilino)fluoran, 2-amino-6-(N-propyl anilino)fluoran, 2-amino-6-(N-methyl-p-toluidino)fluoran, 2-amino-6-(N-ethyl-p-toluidino)fluoran, 2-amino-6-(N-propyl-p-toluidino)fluoran, 2-amino-6-(N-methyl-p-ethyl anilino)fluoran, 2-amino-6-(N-ethyl-p-ethyl anilino)fluoran, 2-amino-6-(N-propyl-p-ethyl anilino)fluoran, 2-amino-6-(N-methyl-2,4-dimethyl anilino) fluoran, 2-amino-6-(N-ethyl-2,4-dimethyl anilino)fluoran, 2-amino-6-(N-propyl-2,4-dimethyl anilino)fluoran, 2-amino-6-(N-methyl-p-chloroanilino)fluoran, 2-amino-6-(N-ethyl-p-chloroanilino)fluoran, 2-amino-6-(N-propyl-p-chloroanilino)fluoran, 2,3-dimethyl-6-dimethylamino fluoran, 3-methyl-6-(N-ethyl-p-toluidino)fluoran, 2-chloro-6-diethylamino fluoran, 2-bromo-6-diethylamino fluoran, 2-chloro-6-dipropylamino fluoran, 3-chloro-6-cyclohexylamino fluoran, 3-bromo-6-cyclohexylamino fluoran, 2-chloro-6-(N-ethyl-N-isoamylamino)fluoran, 2-chloro-3-methyl-6-diethylamino fluoran, 2-anilino-3-chloro-6-diethylamino fluoran, 2-(o-chloroanilino)-3-chloro-6-cyclohexylamino fluoran, 2-(m-trifluoromethyl anilino)-3-chloro-6-diethylamino fluoran, 2-(2,3-dichloroanilino)-3-chloro-6-diethylamino fluoran, 1,2-benzo-6-diethylamino fluoran, 1,2-benzo-6-(N-ethyl-N-isoamylamino)fluoran, 1,2-benzo-6-dibutylamino fluoran, 1,2-benzo-6-(N-ethyl-N-cyclohexylamino)fluoran, 1,2-benzo-6-(N-ethyl-toluidino)fluoran, 2-anilino-3-methyl-6-(N-2-ethoxypropyl-N-ethylamino)fluoran, 2-(p-chloroanilino)-6-(N-n-octylamino)fluoran, 2-(p-chloroanilino)-6-(N-n-palmitylamino)fluoran, 2-(p-chloroanilino)-6-(di-n-octylamino)fluoran, 2-benzoyl amino-6-(N-ethyl-p-toluidino)fluoran, 2-(o-methoxy benzoyl amino)-6-(N-ethyl-p-toluidino)fluoran, 2-dibenzylamino-4-methyl-6-diethylamino fluoran, 2-dibenzylamino-4-methoxy-6-(N-methyl-p-toluidino)fluoran, 2-dibenzylamino-4-methyl-6-(N-ethyl-p-toluidino)fluoran, 2-(alpha-phenylethyl amino)-4-methyl-6-diethylamino fluoran, 2-(p-toluidino)-3-(t-butyl)-6-(N-methyl-p-toluidino)fluoran, 2-(o-methoxycarbonyl anilino)-6-diethylamino fluoran, 2-acetylamino-6-(N-methyl-p-toluidino)fluoran, 3-diethylamino-6-(m-trifluoromethyl anilino) fluoran, 4-methoxy-6-(N-ethyl-p-toluidino)fluoran, 2-ethoxyethyl amino-3-chloro-6-dibutylamino fluoran, 2-dibenzylamino-4-chloro-6-(N-ethyl-p-toluidino)fluoran, 2-(alpha-phenylethyl amino)-4-chloro-6-diethylamino fluoran, 2-(N-benzyl-p-trifluoromethyl anilino)-4-chloro-6-diethylamino fluoran, 2-anilino-3-methyl-6-pyrrolidino fluoran, 2-anilino-3-chloro-6-pyrrolidino fluoran, 2-anilino-3-methyl-6-(N-ethyl-N-tetrahydro furfuryl amino)fluoran, 2-mesidino-4',5'-benzo-6-diethylamino fluoran, 2-(m-trifluoromethyl anilino)-3-methyl-6-pyrrolidino fluoran, 2-(alpha-naphthylamino)-3,4-benzo-4'-bromo-6-(N-benzyl-N-cyclohexyl amino) fluoran, 2-piperidino-6-diethylamino fluoran, 2-(N-n-propyl-p-trifluoromethyl anilino)-6-morpholino fluoran, 2-(di-N-p-chlorophenyl-methylamino)-6-pyrrolidino fluoran, 2-(N-n-propyl-m-trifluoromethyl anilino)-6-morpholino fluoran, 1,2-benzo-6-(N-ethyl-N-n-octyl amino)fluoran, 1,2-benzo-6-diallylamino fluoran, 1,2-benzo-6-(N-ethoxyethyl-N-ethylamino)fluoran, benzo leuco methylene blue, 2-[3,6-bis(diethylamino)]-6-(o-chloroanilino)xanthyl lactam benzoate, 2-[3,6-bis(diethylamino)]-9-(o-chloroanilino)xanthyl lactam benzoate, 3,3-bis(p-dimethylamino phenyl)phthalide, 3,3-bis(p-dimethylamino phenyl)-6-dimethylamino phthalide, 3,3-bis(p-dimethylamino phenyl)-6-diethylamino phthalide, 3,3-bis(p-dimethylamino phenyl)-6-chloro phthalide, 3,3-bis(p-dibutylamino phenyl)phthalide, 3-(2-methoxy-4-dimethylamino phenyl)-3-(2-hydroxy-4,5-dichlorophenyl)phthalide, 3-(2-hydroxy-4-dimethylamino phenyl)-3-(2-methoxy-5-chloro phenyl)phthalide, 3-(2-hydroxy-4-dimethoxyamino phenyl)-3-(2-methoxy-5-chlorophenyl)phthalide, 3-(2-hydroxy-4-dimethylamino phenyl)-3-(2-methoxy-5-nitrophenyl)phthalide, 3-(2-hydroxy-4-diethylamino phenyl)-3-(2-methoxy-5-methylphenyl)phthalide, 3,6-bis(dimethylamino)fluorene spiro(9,3')-6'-dimethylamino phthalide, 6'-chloro-8'-methoxy-benzoindolino-spiropyran, and 6'-bromo-2'-methoxy-benzoindolino-spiropyran.

—Developer—

Various electron-accepting substances that react with the leuco dye when heated to make the leuco dye develop a color are used as the developer. Specific examples of the developer include phenolic compounds and organic or inorganic acidic compounds or esters and salts of the organic or inorganic acidic compounds presented below.

Examples of the developer include a gallic acid, a salicylic acid, a 3-isopropyl salicylic acid, a 3-cyclohexyl salicylic acid, a 3,5-di-t-butyl salicylic acid, a 3,5-di-alpha-methyl benzyl salicylic acid, 4,4'-isopropylidene diphenol, 1,1'-isopropylidene bis(2-chlorophenol), 4,4'-isopropylidene bis(2,6-dibromo phenol), 4,4'-isopropylidene bis(2,6-dichlorophenol), 4,4'-isopropylidene bis(2-methyl phenol), 4,4'-isopropylidene bis(2,6-dimethyl phenol), 4,4'-isopropylidene bis(2-t-butyl phenol), 4,4'-s-butylidene diphenol, 4,4'-cyclohexylidene bisphenol, 4,4'-cyclohexylidene bis(2-methyl phenol), 4-t-butyl phenol, 4-phenyl phenol, 4-hydroxy diphenoxide, alpha-naphthol, beta-naphthol, 3,5-xylenol, thymol, methyl-4-hydroxy benzoate, 4-hydroxy acetophenone, a novolac-based phenol resin, 2,2'-thiobis(4,6-dichlorophenol), catechol, resorcin, hydroquinone, pyrogallol, fluoroglycine, a fluoroglycine carboxylic acid, 4-t-octyl catechol, 2,2'-methylene bis(4-chlorophenol), 2,2'-methylene bis(4-methyl-6-t-butyl phenol), 2,2'-dihydroxy diphenyl, ethyl p-hydroxy benzoate, propyl p-hydroxy benzoate, butyl p-hydroxy benzoate, benzyl p-hydroxy benzoate, p-hydroxybenzoic acid-p-chlorobenzyl, p-hydroxybenzoic acid-o-chlorobenzyl, p-hydroxybenzoic acid-p-methyl benzyl, p-hydroxybenzoic acid-n-octyl, a benzoic acid, zinc salicylate, a 1-hydroxy-2-naphthoic acid, a 2-hydroxy-6-naphthoic acid, zinc 2-hydroxy-6-naphthoate, 4-hydroxy diphenyl sulfone, 4-hydroxy-4'-chlorodipheyl sulfone, bis (4-hydroxyphenyl)sulfide, a 2-hydroxy-p-toluic acid, zinc 3,5-di-t-butyl salicylate, tin 3,5-di-t-butyl salicylate, a tartaric acid, an oxalic acid, a maleic acid, a citric acid, a succinic acid, a stearic acid, a 4-hydroxy phthalic acid, a boric acid, a thiourea derivative, a 4-hydroxy thiophenol derivative, a bis(4-hydroxyphenyl)acetic acid, ethyl bis(4-hydroxyphenyl)acetate, n-propyl bis(4-hydroxyphenyl)acetate, n-butyl bis(4-hydroxyphenyl)acetate, phenyl bis(4-hydroxyphenyl)acetate, benzyl bis(4-hydroxyphenyl)acetate, phenethyl bis(4-hydroxyphenyl)acetate, a bis(3-methyl-4-hydroxyphenyl)acetic acid, methyl bis(3-methyl-4-hydroxyphenyl)acetate, n-propyl bis(3-methyl-4-hydroxyphenyl)acetate, 1,7-bis(4-hydroxyphenyl thio)-3,5-dioxaheptane, 1,5-bis(4-hydroxyphenyl thio)-3-oxapentane, dimethyl 4-hydroxy phthalate, 4-hydroxy-4'-methoxy diphenyl sulfone, 4-hydroxy-4'-ethoxy diphenyl sulfone, 4-hydroxy-4'-isopropoxy diphenyl sulfone, 4-hydroxy-4'-propoxy diphenyl sulfone, 4-hydroxy-4'-butoxy diphenyl sulfone, 4-hydroxy-4'-isobutoxy diphenyl sulfone, 4-hydroxy-4'-s-butoxy diphenyl sulfone, 4-hydroxy-4'-t-butoxy diphenyl sulfone, 4-hydroxy-4'-benzyloxy diphenyl sulfone, 4-hydroxy-4'-phenoxy diphenyl sulfone, 4-hydroxy-4'-(m-methyl benzyloxy)diphenyl sulfone, 4-hydroxy-4'-(p-methyl benzyloxy)diphenyl sulfone, 4-hydroxy-4'-(o-methyl benzyloxy)diphenyl sulfone, and 4-hydroxy-4'-(p-chlorobenzyloxy)diphenyl sulfone.

—Other Components—

The other components are not particularly limited, and arbitrary components may be selected according to the purpose. Examples of the other components include auxiliary additive components commonly used in this kind of a thermal recording material, such as a water-soluble polymer and an aqueous resin emulsion, a filler, a thermally fusible substance, and a surfactant. One kind of each of the other components may be used alone, or two or more kinds may be used in combination.

The water-soluble polymer and the aqueous resin emulsion are not particularly limited, and known ones that are commonly used for a thermosensitive color-developing layer may be used.

The filler is not particularly limited, and an arbitrary filler may be selected according to the purpose. Examples of the filler include inorganic powders of calcium carbonate, silica, zinc oxide, titanium oxide, aluminium hydroxide, zinc hydroxide, barium sulfate, clay, talc, and surface-treated calcium carbonate and silica, and organic powders of a urea-formalin resin, a styrene/methacrylic acid copolymer, and a polystyrene resin.

The thermally fusible substance is not particularly limited, and an arbitrary thermally fusible substance may be selected according to the purpose. Examples of the thermally fusible substance include fatty acids such as a stearic acid and a behenic acid, fatty acid amides such as a stearic acid amide and a palmitic acid amide, fatty acid metal salts such as zinc stearate, aluminium stearate, calcium stearate, zinc palmitate, and zinc behenate, and other thermally fusible organic compounds that have a melting point in a range of from about 50 degrees Celsius through 200 degrees Celsius such as p-benzyl biphenyl, m-terphenyl, triphenylmethane, benzyl p-benzyloxy benzoate, beta-benzyloxy naphthalene, phenyl beta-naphthoate, phenyl 1-hydroxy-2-naphthoate, methyl 1-hydroxy-2-naphthoate, diphenyl carbonate, guaiacol carbonate, dibenzyl terephthalate, dimethyl terephthalate, 1,4-dimethoxy naphthalene, 1,4-diethoxy naphthalene, 1,4-dibenzyloxy naphthalene, 1,2-diphenoxy ethane, 1,2-bis(3-methyl phenoxy)ethane, 1,2-bis(4-methyl phenoxy)ethane, 1,4-diphenoxy-2-butene, 1,2-bis(4-methoxy phenylthio)ethane, dibenzoyl methane, 1,4-diphenylthio butane, 1,4-diphenylthio-2-butene, 1,3-bis(2-vinyloxy ethoxy)benzene, 1,4-bis(2-vinyloxy ethoxy)benzene, p-(2-vinyloxy ethoxy)biphenyl, p-aryloxy biphenyl, p-propargyloxy biphenyl, dibenzoyloxy methane, dibenzoyloxy propane, dibenzyl disulfide, 1,1-diphenyl ethanol, 1,1-diphenyl propanol, p-benzyloxy benzyl alcohol, 1,3-phenoxy-2-propanol, N-octadecyl carbamoyl-p-methoxy carbonyl benzene, N-octadecyl carbamoyl benzene, 1,2-bis(4-methoxy phenoxy)propane, 1,5-bis(4-methoxy phenoxy)-3-oxapentane, 1,2-bis(3,4-dimethyl phenyl)ethane, dibenzyl oxalate, an oxalic acid bis(4-methyl benzyl)ester, an oxalic acid bis(4-chlorobenzyl)ester, and 4-aceto toluidide.

<Undercoat Layer>

In the linerless label 3 for thermal recording, it is preferable that the undercoat layer 11 containing a binder, a filler, a thermally fusible substance, etc. be further provided between the support 10 and the thermosensitive color-developing layer 12 as needed. Purposes of providing the undercoat layer 11 include prevention of migration of the adhesive into the thermosensitive color-developing layer 12, improvement of a color-developing sensitivity, smoothness, and adhesiveness, etc.

The filler in the undercoat layer 11 is preferably hollow particles. For example, hollow particles of which shell is made of a thermoplastic resin and that has a percentage of hollowness of higher than or equal to 30% (typically, in a range of from 33% through 99%) and a mass average particle diameter in a range of from 0.4 micrometers through 10 micrometers may be used. The percentage of hollowness (%) as used herein refers to a ratio between a diameter of a hollow portion and an outer diameter of the hollow particles and is represented by (inner cubic content of hollow particles)/(outer cubic content of hollow particles) 3 100 (%). As the binder and the thermally fusible substance, the same ones as those that are presented for the protective layer 13, etc. may be used.

It is preferable to provide the undercoat layer 11 in a manner that the attached amount of the undercoat layer 11 is in a range of from 2 $g/m^2$ through 10 $g/m^2$ after dried. It is more preferable that the undercoat layer 11 contain hollow particles having a percentage of hollowness of higher than or equal to 80% and a weight average particle diameter in a range of from 0.8 micrometers through 5 micrometers, and that the attached amount of the undercoat layer 11 be in a range of from 2.5 $g/m^2$ through 7 $g/m^2$ after dried. This makes it possible to provide a linerless label 3 for thermal recording having a high sensitivity during image printing.

A content of the hollow particles is preferably in a range of from 35% by mass through 80% by mass of the whole composition of the undercoat layer 11. Due to variation of the specific gravity depending on the percentage of hollowness, a content of hollow particles having a higher percentage of hollowness occupies a smaller mass ratio. When the content of the hollow particles is less than 35% by mass, it is difficult to obtain a sensitivity effect. When the content of the hollow particles is greater than 80% b by mass, bindability of the layer is impaired.

<Support>

The support 10 may be of any form, any structure, and any size that may be appropriately selected according to the purpose. The support 10 may have a form of, for example, a flat panel, may have a single-layer structure or a laminated structure as the structure, and may have a size that is appropriately selected according to the size, thickness, etc. of the layers to be laminated.

The material of the support 10 may also be appropriately selected according to the purpose. Various inorganic materials and organic materials may be used. Examples of the inorganic materials include glass, quartz, silicon, silicon oxide, aluminium oxide, $SiO_2$, and metals. Examples of the organic materials include: paper such as quality paper, art paper, coat paper, and synthetic paper; cellulose derivatives such as cellulose triacetate; and polymer films made of polyester resins such as polyethylene terephthalate (PET) and polybutylene terephthalate, polycarbonate, polystyrene, polymethyl methacrylate, polyethylene, polypropylene, etc. Among these, quality paper, art paper, coat paper, and polymer films are preferable. One of these may be used alone, or two or more of these may be used in combination.

It is preferable to reform the surface of the support 10 through a corona discharge treatment, an oxidizing reaction treatment (a chromic acid, etc.), an etching treatment, an adhesion facilitating treatment, an antistatic treatment, etc. in order to improve adhesiveness with the layers to be laminated. It is also preferable to make the support 10 white by adding a white pigment such as titanium oxide, etc.

A thickness of the support 10 may be appropriately selected according to the purpose. However, the thickness is preferably in a range of from 40 micrometers through 100 micrometers in consideration of conveyability in a label printer apparatus when the label is set in the label printer apparatus and workability in winding up the label to a roll shape.

<Adhesive Layer>

A main component of the adhesive used in the adhesive layer 16 is preferably at least one selected from the group consisting of an acrylic resin, an acrylic acid ester-styrene copolymer, and an acrylic acid ester-methacrylic acid ester-styrene copolymer that are obtained by emulsion polymerization of a monomer that contains at least one kind of a (meth)acrylic acid alkyl ester containing an alkyl group as a main body.

Here, the "main component" means that the adhesive is made of only the resin, except for additives blended as needed, such as a permeating agent, a film-forming aid, a defoamer, an anti-rust agent, a thickener, a wetting agent, an antiseptic, an ultraviolet absorbing agent, a light stabilizer, a pigment, and an inorganic filler. Further, "(meth)acrylic" as used herein means "acrylic or methacrylic".

Specific examples of the (meth)acrylic acid alkyl ester include n-pentyl (meth)acrylate, n-hexyl (meth)acrylate, 2-ethylhexyl (meth)acrylate, n-octyl (meth)acrylate, isooctyl (meth)acrylate, n-decyl (meth)acrylate, and n-dodecyl (meth)acrylate. One of these may be used alone, or two or more of these may be used in combination.

In addition to this component, a carboxyl group-containing radical-polymerizable unsaturated monomer, and a radical-polymerizable unsaturated monomer copolymerizable with each of the following unsaturated monomers: the (meth)acrylic acid alkyl ester and the carboxyl group-containing radical-polymerizable unsaturated monomer may be added as needed. Specific examples of the carboxyl group-containing radical-polymerizable unsaturated monomer include alpha, beta-unsaturated carboxylic acids such as a (meth)acrylic acid, and alpha, beta-unsaturated dicarboxylic acids such as an itaconic acid, a maleic acid, and a 2-methylene glutaric acid. One of these may be used alone, or two or more of these may be used in combination.

An attached amount of the adhesive is preferably in a range of from 8 $g/m^2$ through 30 $g/m^2$ after dried. When the attached amount of the adhesive is less than 8 $g/m^2$, a sufficient adhesive force is not obtained, and particularly, the label cannot be pasted on a target having a coarse surface, such as cardboard. When the attached amount is greater than 30 $g/m^2$, a high load is imposed on the cutter blades during cutting. The attached amount of greater than 30 $g/m^2$ is also not preferable in terms of cost, and a disadvantage of leakage of the adhesive when the label is made into a roll shape, which is the final form.

A method for applying the adhesive is not particularly limited, and an arbitrary method may be selected according to the purpose. Examples of the method include a roll coater, a knife coater, a bar coater, a slot die coater, and a curtain coater.

The adhesive layer 16 can be formed by directly applying the adhesive over a surface of the label support opposite to the surface over which the release layer 14 is provided and drying the adhesive, or by applying the adhesive over a base having releasability, drying the adhesive, transferring the adhesive to a surface of the label support over which a release layer is not provided, and then peeling only the base.

In the case of applying the adhesive over a base having releasability, drying the adhesive, and then transferring the adhesive to the label support, there is a need of peeling the base after the transfer. This increases the producing steps and is inefficient. On the other hand, there is an advantage that the label support is not constrained because the adhesive is transferred after dried and does not permeate the label support.

Preferred conditions of the respective layers in order for the linerless label 3 for thermal recording to result in $\Delta V(ave)$ of less than or equal to 2.0 V when measured with the apparatus 100 according to the measuring method described above have been described above. In the steps of applying these layers, it is preferable to treat the surface (at the 10a side of the support) to have an Oken smoothness of greater than or equal to 1,000 seconds by calendering before the steps of providing the adhesive layer 16 and the release layer 14 over the support 10 are performed, i.e., when the protective layer 13, the thermosensitive color-developing layer 12, the undercoat layer 11, and the backside barrier layer 15 have been provided over the support 10. The Oken smoothness is more preferably greater than or equal to 2,000 seconds.

Notwithstanding the above said, calendering is not indispensable when the surface (at the 10a side of the support) has already have a sufficiently high Oken smoothness (e.g., greater than or equal to 2,000 seconds) before the step of calendering, which is often the case when synthetic paper is used for the support 10.

In the present invention, it is possible to reduce adhesion of the adhesive to the cutter blades by reducing the attached amount of the adhesive. However, this reduces the adhesive force, and makes the function as the label problematic.

(Cutting Apparatus)

A cutting apparatus of the present invention includes two cutter blades above and below the linerless label of the present invention for cutting the linerless label, and further includes other units as needed.

(Thermal Recording Apparatus)

A thermal recording apparatus of the present invention includes the cutting apparatus of the present invention and a recording unit configured to perform recording over the linerless label for thermal recording of the present invention, and further includes other units as needed.

Examples of the recording unit include a thermal head, a thermal stamp, and a laser marker.

EXAMPLES

Linerless labels were produced based on the formulations of Examples 1 to 14 and Comparative Examples 1 to 5 described below. In Examples and Comparative Examples below, "%" represents "% by mass" and "part" represents "part by mass".

Example 1

<Preparation of Protective Layer Liquid>

The composition described below was subjected to a dispersion treatment using a sand mill for 24 hours, to prepare a <liquid A>.
<Liquid A>
Aluminium hydroxide (HIGILITE H-43M available from Showa Denko K.K., with an average particle diameter of 0.6 micrometers) - - - 20 parts
A 10% aqueous solution of itaconic acid-modified polyvinyl alcohol - - - 20 parts Water - - - 60 parts Next, the composition described below was mixed and stirred to prepare a protective layer liquid <liquid B>.
<Liquid B>
<Liquid A> - - - 75 parts
A 10% aqueous solution of diacetone-modified polyvinyl alcohol - - - 100 parts
A 10% aqueous solution of N-amino polyacrylamide (with a weight average molecular weight of 10,000 and a degree of hydrazidation of 50%) - - - 15 parts
A 1% aqueous solution of ammonia - - - 5 parts
Water - - - 105 parts
<Preparation of Thermosensitive Color-Developing Layer Coating Liquid>
<Liquid C>
2-anilino-3-methyl-6-(di-n-butylamino)fluoran - - - 20 parts
A 10% aqueous solution of itaconic acid-modified polyvinyl alcohol (with a modification rate of 1 mol %) - - - 20 parts
Water - - - 60 parts
<Liquid D>
4-hydroxy-4'-isopropoxy diphenyl sulfone - - - 20 parts
A 10% aqueous solution of itaconic acid-modified polyvinyl alcohol (with a modification rate of 1 mol %) - - - 20 parts
Silica - - - 10 parts
Water - - - 50 parts Each of the <liquid C> and the <liquid D> having the compositions described above was subjected to a dispersion treatment using a sand mill until the average particle diameter became less than or equal to 1.0 micrometer, to prepare a dye dispersion liquid <liquid C> and a developer dispersion liquid <liquid D>. Then, the <liquid C> and the <liquid D> were mixed at a ratio of 1:7 to adjust a solid content to 25%, and stirred to prepare a thermosensitive color-developing layer coating liquid <liquid E>.

<Preparation of Undercoat Layer Coating Liquid>

Next, the composition described below was mixed and stirred to prepare an undercoat layer coating liquid <liquid F>.
Kaolin (ULTRAWHITE 90 available from Engelhard Corporation) - - - 36 parts
A styrene/butadiene copolymer (SMARTEX PA-8076 available from Nippon A&L Inc., with a solid content concentration of 47.5%) - - - 10 parts
Water - - - 54 parts
<Preparation of Backside Barrier Layer Coating Liquid>
<Liquid G-1>
Next, the composition described below was mixed and stirred to prepare a backside barrier layer coating liquid <liquid G-1>.

A styrene/acrylic acid ester copolymer (A) (JONCRYL PDX7440 available from BASF GmbH, with a solid content concentration of 48.5% and Tg of 40 degrees Celsius) - - - 50 parts
Water - - - 50 parts
<Preparation of Release Layer Coating Liquid>

The composition described below was mixed and stirred to prepare a <liquid H>.
A cationically-curable UV silicone resin (SILCOLEASE UV POLY215 available from Arakawa Chemical Industries, Ltd.) - - - 100 parts
A light peel adjusting agent (SILCOLEASE RCA200 available from Arakawa Chemical Industries, Ltd.) - - - 15 parts
A reaction initiator (SILCOLEASE UV CATA211 available from Arakawa Chemical Industries, Ltd.) - - - 5 parts The undercoat layer coating liquid <liquid F> was applied over a surface of a base-paper support (quality paper with a basis weight of about 60 g/m$^2$) such that an attached amount after dried would be 3.0 g/m$^2$, and then dried to form an undercoat layer.

Next, the thermosensitive color-developing layer coating liquid <liquid E> and the protective layer coating liquid <liquid B> were applied in order to be laminated over the undercoat layer such that attached amounts after dried would be 3.0 g/m$^2$ and 2.0 g/m$^2$ respectively, and then dried to form a thermosensitive color-developing layer and a protective layer. Further, the backside barrier layer coating liquid <liquid G-1> was applied in an amount of 2.0 g/m$^2$ over a surface of the support opposite to the surface over which the undercoat layer was formed, and then dried to formed a backside barrier layer.

After this, the surface was treated with a calender such that Oken smoothness of the surface would be about 2,000 seconds. Next, the release layer coating liquid <liquid H> was applied in a weight of 1.0 g/m$^2$ over the protective layer. After this, the release layer coating liquid was cured by ultraviolet irradiation under the conditions described below, to obtain a thermal recording material over which a release layer was provided. The release layer was rubbed with a finger to confirm that the release layer was not in the liquid state but had cured.

<Ultraviolet Irradiation Conditions>

Ultraviolet irradiator: TOSURE2000 (model name: KUV-20261-1X) available from Toshiba Denzai Co., Ltd.
Ultraviolet irradiation conditions: five times of irradiation at a full optical output (in a range of from 10 amperes through 12 amperes on an ammeter) at an irradiation speed of 5 m/min.

Next, an acrylic emulsion as a pressure-sensitive adhesive (AQUENCE PS AQ590 NACOR available from Henkel Japan Ltd., with a solid content concentration of 54%) was applied over the backside barrier layer on the back surface of the support such that a weight after dried would be 20 g/m$^2$, and then dried, and the resultant was wound up in a roll shape to stick the backside barrier layer to the release layer of the thermal recording material, to obtain a linerless label for thermal recording of Example 1.

Example 2

A linerless label for thermal recording of Example 2 was produced in the same manner as in Example 1, except that synthetic paper (with a basis weight of about 75 g/m$^2$) was used as the base-paper support instead of the quality paper of Example 1, the backside barrier layer coating liquid <liquid G-1> was not applied, and calendering was not performed.

Example 3

A linerless label for thermal recording of Example 3 was produced in the same manner as in Example 1, except that the <liquid G-1> used in Example 1 was changed to a <liquid G-2> described below.
<Liquid G2>
A polyolefin resin (EW-5303 available from Toyobo Co., Ltd., with a solid content concentration of 29.9%) - - - 70 parts
Water - - - 30 parts

Example 4

A linerless label for thermal recording of Example 4 was produced in the same manner as in Example 1, except that the <liquid G-1> used in Example 1 was changed to a <liquid G-3> described below.
<Liquid G-3>
A styrene/butadiene copolymer (LX407ST5674 available from Zeon Corporation, with a solid content concentration of 48.5% and Tg of 10 degrees Celsius) - - - 50 5parts
Water - - - 50 parts

Example 5

A linerless label for thermal recording of Example 5 was produced in the same manner as in Example 1, except that the <liquid G-1> used in Example 1 was changed to a <liquid G-4> described below.
<Liquid G-4>
A urethane resin (SUPERFLEX 800 available from DKS Co. Ltd., with a solid content concentration of 35.2% and Tg of 46 degrees Celsius) - - - 60 parts
Water - - - 40 parts

Example 6

A linerless label for thermal recording of Example 6 was produced in the same manner as in Example 1, except that the <liquid G-1> used in Example 1 was changed to a <liquid G-5> described below.
<Liquid G-5>
A styrene/acrylic acid ester copolymer (A) (JONCRYL PDX7440 available from BASF GmbH, with a solid content concentration of 48.5% and Tg of 40 degrees Celsius) - - - 25 parts
A styrene/butadiene copolymer (A) (LX407ST5674 available from Zeon Corporation, with a solid content concentration of 48.5% and Tg of 10 degrees Celsius) - - - 25 parts
Water - - - 50 parts

Example 7

A linerless label for thermal recording of Example 7 was produced in the same manner as in Example 1, except that the <liquid G-1> used in Example 1 was changed to a <liquid G-6> described below.
<Liquid G-6>
A styrene/acrylic acid ester copolymer (C) (JONCRYL PDX7177 available from BASF GmbH, with a solid content concentration of 36% and Tg of 113 degrees Celsius) - - - 50 parts
Water - - - 50 parts

Example 8

A linerless label for thermal recording of Example 8 was produced in the same manner as in Example 1, except that the <liquid G-1> used in Example 1 was changed to a <liquid G-7> described below.
<Liquid G-7>
A styrene/acrylic acid ester copolymer (D) (JONCRYL PDX7643 available from BASF GmbH, with a solid content concentration of 51.5% and Tg of 98 degrees Celsius) - - - 50 parts
Water - - - 50 parts

Example 9

A linerless label for thermal recording of Example 9 was produced in the same manner as in Example 1, except that the <liquid G-1> used in Example 1 was changed to a <liquid G-8> described below.
<Liquid G-8>
A styrene/acrylic acid ester copolymer (E) (JONCRYL PDX390 available from BASF GmbH, with a solid content concentration of 46% and Tg of minus 5 degrees Celsius) - - - 50 parts
Water - - - 50 parts

Example 10

A linerless label for thermal recording of Example 10 was produced in the same manner as in Example 1, except that the <liquid G-1> used in Example 1 was changed to a <liquid G9> described below.
<Liquid G-9>
A styrene/acrylic acid ester copolymer (F) (YJ2741 D aq available from BASF GmbH, with a solid content concentration of 56% and Tg of minus 14 degrees Celsius) - - - 50 parts
Water - - - 50 parts

Example 11

A linerless label for thermal recording of Example 11 was produced in the same manner as in Example 1, except that the <liquid G-1> used in Example 1 was changed to a <liquid G-10> described below.
<Liquid G-10>
A styrene/acrylic acid ester copolymer (A) (JONCRYL PDX7440 available from BASF GmbH, with a solid content concentration of 48.5% and Tg of 40 degrees Celsius) - - - 50 parts
Aluminium hydroxide (HIGILITE H-43M available from Showa Denko K.K., with an average particle diameter of 0.6 micrometers) - - - 20 parts
Water - - - 50 parts

Example 12

First, the backside barrier layer coating liquid <liquid G-1> used in Example 1 was not applied.
Further, the acrylic emulsion as the pressure-sensitive adhesive (AQUENCE PS AQ590 NACOR available from Henkel Japan Ltd., with a solid content concentration of 54%) was not directly applied over the support. Instead, the adhesive was applied over a release paper such that a weight after dried would be 20 g/m², then dried to laminate the adhesive over the release paper, and then transferred to the support to apply the adhesive over the support. After the adhesive was transferred, the release paper was peeled, to produce a linerless label for thermal recording of Example 12. The production procedure was the same as in Example 1 except for these points.

Example 13

A linerless label for thermal recording of Example 13 was produced in the same manner as in Example 1, except that the acrylic emulsion as the pressure-sensitive adhesive (AQUENCE PS AQ590 NACOR available from Henkel Japan Ltd., with a solid content concentration of 54%) used in Example 1 was applied in an attached amount that would be a weight of 10 g/m² after dried.

Example 14

A linerless label of Example 14 was produced in the same manner as in Example 1, except that the protective layer coating liquid <liquid B>, the thermosensitive color-developing layer coating liquid <liquid E>, and the undercoat layer coating liquid <liquid F> used in Example 1 were not applied.

Comparative Example 1

A linerless label for thermal recording of Comparative Example 1 was produced in the same manner as in Example 1, except that the backside barrier layer coating liquid <liquid G-1> used in Example 1 was not applied.

Comparative Example 2

A linerless label for thermal recording of Comparative Example 2 was produced in the same manner as in Example 1, except that the <liquid G-1> used in Example 1 was changed to a <liquid G-11> described below.
<Liquid G-11>
A 10% aqueous solution of a completely saponified polyvinyl alcohol - - - 50 parts
Water - - - 50 parts

Comparative Example 3

A linerless label for thermal recording of Comparative Example 3 was produced in the same manner as in Example 1, except that the acrylic emulsion as the pressure-sensitive adhesive (AQUENCE PS AQ590 NACOR available from Henkel Japan Ltd., with a solid content concentration of 54%) used in Example 1 was applied in an attached amount that would be a weight of 40 g/m² after dried.

Comparative Example 4

First, the backside barrier layer coating liquid <liquid G-1> used in Example 1 was not applied.
Further, the acrylic emulsion as the pressure-sensitive adhesive (AQUENCE PS AQ590 NACOR available from Henkel Japan Ltd., with a solid content concentration of 54%) was applied over a surface of the release layer such that a weight after dried would be 20 g/m2, and then dried, and the resultant was wound up in a roll shape to stick the release layer to the back surface, to produce a linerless label for thermal recording of Comparative Example 4. The production procedure was the same as in Example 1 except for these points.

Comparative Example 5

A linerless label of Comparative Example 5 was obtained in the same manner as in Example 1, except that the protective layer coating liquid <liquid B> the thermosensitive color-developing layer coating liquid <liquid E>, the undercoat layer coating liquid <liquid F>, and the backside barrier layer coating liquid <liquid G-1> used in Example 1 were not applied.

In the production of the linerless labels for thermal recording and the linerless labels of Examples 1 to 14 and Comparative Examples 1 to 5 described above, a label support for thermal recording and a label support, which were products before an adhesive layer was applied, were produced for the respective linerless labels for thermal recording and the respective linerless labels.

The linerless labels for thermal recording obtained in each of Examples 1 to 13 and Comparative Examples 1 to 4 were evaluated in terms of print image fading, jamming, cutter load voltage measurement, an adhesive force, and a label support backside barrier property in the manners described below. The linerless labels of Example 14 and Comparative Example 5 did not include a thermal recording layer. Therefore, these linerless labels were not evaluated in terms of print image fading, but were evaluated in terms of only jamming, cutter load voltage measurement, and an adhesive force.

In the following description regarding Examples and Comparative Examples, both of the linerless labels for thermal recording and the linerless labels will be described as linerless label uniformly. Further, both of the label supports for thermal recording and the label supports will be described as label support uniformly.

Print image fading and jamming were evaluated with IP-UNI (printer) available from
Ishida Co., Ltd.
<Print Image Fading>
IP-UNI available from Ishida Co., Ltd. and each linerless label were left to stand still under conditions of 23±1 degrees Celsius and 50±2% RH for 4 hours for humidity conditioning. Contamination on the cutter blades was sufficiently cleaned beforehand. After this, an operation of printing and cutting each linerless label was repeated fifteen thousand times with the apparatus described above, and each linerless label was judged according to Table 1 below based on the number of label pieces on which print image fading occurred among the produced fifteen thousand label pieces. Print image fading as used herein means that a faded portion (i.e., a portion that was heated and ought to have developed a color but did not developed a color) occupied an area greater than or equal to 10% of the area of the printed portion in one label piece.

TABLE 1

| Criteria for judging print image fading | |
|---|---|
| Number of pieces/issued 15,000 pieces | Judgment |
| 0 | AA |
| From 1 through 15 | A |
| From 16 through 150 | B |
| More than or equal to 151 | D |

<Jamming>

IP-UNI available from Ishida Co., Ltd. and each linerless label were left to stand still under conditions of 23±1 degrees Celsius and 50±2% RH for 4 hours for humidity conditioning. Contamination on the cutter blades was cleaned beforehand. After this, an operation of printing and cutting each linerless label was repeated fifteen thousand times with the apparatus described above, to confirm whether jamming would occur during fifteen thousand times of cutting. Jamming as used herein refers to a failure to continue issuing without a human interference, due to a cutting failure by the cutter blades, roll-in around platen rolls, etc. A linerless label that did not cause jamming during fifteen thousand times of cutting was judged to be OK (B), and a linerless label that caused jamming more than or equal to once was judged to be NG (D).

<Measurement and Evaluation of Cutter Load Voltage>

Using HALLO NEO-7 H23T available from Shinsei Industries Co., Ltd. as the apparatus 100, the $\Delta V(ave)$ value of the linerless label of each of Examples 1 to 14 and Comparative Examples 1 to 5 was obtained according to (Method for measuring cutter load voltage) and the formula (3) described in the embodiment. The cutter load voltage was measured by coupling a probe (PP006A available from LeCroy Corporation) of an oscilloscope (WAVERUNNER LT584L available from LeCroy Corporation) to the terminals 141 and 142 of the motor 140 of the apparatus 100. Here, the sampling rate of the oscilloscope was set to 2.5 MS/s.

Specifically, first, the apparatus 100, each linerless label (each having a width of 60±1 mm), and each label support (each having a width of 60±1 mm) corresponding to each linerless label were prepared and left to stand still under conditions of 23±1 degrees Celsius and 50±2% RH for 4 hours for humidity conditioning. Contamination on the cutter blades was cleaned beforehand.

Then, in an initial state in which nothing was set inside the apparatus 100, the lower blade 130 was moved, to measure a load voltage value during twenty times of blank cutting. An average of the twenty measured value was obtained as $V_{label0}(ave)$.

Next, each lineless label was set in the apparatus 100, and an operation of printing and cutting each linerless label was repeated five thousand times. Then, in the state that each linerless label was set, cutting of each linerless label in a manner to move the lower blade 130 and insert the lower blade 130 into the linerless label from a side of the linerless label at which the adhesive layer was provided was performed to measure the load voltage value during cutting performed after the five thousand times of cutting. This measurement was conducted twenty times. An average of the twenty measured values was obtained as $V_{label5000}(ave)$. Then, $\Delta V_{label}(ave)=V_{label5000}(ave)-V_{label0}(ave)$ was calculated.

Next, the linerless label was detached from the apparatus 100, and any contamination over the cutter blades was cleaned. After this, again in the blank cutting state in which nothing was set inside the apparatus 100, the lower blade 130 was moved, to measure the load voltage value during twenty times of blank cutting. An average of the twenty measured values was obtained as $V_{base0}(ave)$.

Next, each label support was set inside the apparatus 100, and in this state, the load voltage value during cutting of the label support in a manner to move the lower blade 130 to cut the label support from a side of the label support at which the release layer was not provided was measured. This measurement was conducted twenty times, and an average of the twenty measured values was obtained as $V_{base}(ave)$. Then, $\Delta V_{base}(ave)=V_{base}(ave)-V_{base0}(ave)$ was calculated.

Finally, $\Delta V(ave)=\Delta V_{label}(ave)-\Delta V_{base}(ave)$ was calculated.

<Evaluation of Adhesive Force>

Each linerless label was cut into a size of (25±1 mm)×(50±3 mm), and an adhesive force of each linerless label to a stainless plate (at a peel angle of 180 degrees) under conditions of 23±1 degrees Celsius and 50±2% RH was measured according to a JIS standard <JIS Z0237>. The criteria for judging are as presented in Table 2.

TABLE 2

| Criteria for judging adhesive force | |
|---|---|
| Adhesive force N/25 mm | Judgment |
| Higher than or equal to 18 | A |
| Higher than or equal to 15 but lower than 18 | B |
| Higher than or equal to 12 but lower than 15 | C |
| Lower than 12 | D |

<Label Support Backside Barrier Property Measurement>

With a wire bar, a wet reagent having a surface tension of 34 mN/m (TENSION CHECKER TC-L-34.0 available from Kasuga Electric Works Ltd., with a surface tension of 34.0 mN/m) was applied in an attached amount of 11.5±1.0 g/m² over a surface of each label support corresponding to each linerless label over which the release layer was not provided, over an area of (50±1 mm)×(50±1 mm). A time taken for the wet reagent to complete permeating the area of the mentioned range from immediately after the wet reagent was applied was measured with a stopwatch. The criteria for judging are as presented in Table 3.

TABLE 3

| Label support backside barrier property | |
|---|---|
| Permeation time (second) | Judgment |
| Longer than or equal to 40 | AA |
| Longer than or equal to 30 but shorter than 40 | A |
| Longer than or equal to 20 but shorter than 30 | B |
| Shorter than 20 | D |

<Results of Evaluation>

The results of evaluation of print image fading, cutter load voltage measurement ($\Delta V(ave)$), and an adhesive force are collectively presented in Table 4 and Table 5 together with the contents of the samples. Table 4 presents the results of the linerless labels of Examples 1 to 13 and Comparative Example 1 to 4, and Table 5 presents the results of the linerless labels of Example 14 and Comparative Example 5.

TABLE 4

| | Sample | | Result of evaluation | | |
|---|---|---|---|---|---|
| | Cutter load voltage (V) | Label support backside barrier property | Print image fading | Jamming | Adhesive property |
| Ex. 1 | 0.7 | AA | AA | B | A |
| Ex. 2 | 0.4 | AA | AA | B | A |
| Ex. 3 | 1.7 | B | B | B | B |
| Ex. 4 | 0.8 | AA | AA | B | A |

TABLE 4-continued

| | Sample | | | |
|---|---|---|---|---|
| | Cutter load voltage (V) | Label support backside barrier property | Result of evaluation | | |
| | | | Print image fading | Jamming | Adhesive property |
| Ex. 5 | 1.9 | B | B | B | B |
| Ex. 6 | 0.6 | AA | AA | B | A |
| Ex. 7 | 2.0 | B | B | B | B |
| Ex. 8 | 1.1 | A | A | B | A |
| Ex. 9 | 1.1 | A | A | B | A |
| Ex. 10 | 1.9 | B | B | B | A |
| Ex. 11 | 1.4 | A | A | B | A |
| Ex. 12 | 1.8 | D | B | B | A |
| Ex. 13 | 0.3 | AA | AA | B | C |
| Comp. Ex. 1 | 3.6 | D | D | D | B |
| Comp. Ex. 2 | 2.7 | D | D | D | B |
| Comp. Ex. 3 | 7.3 | AA | D | D | A |
| Comp. Ex. 4 | 5.4 | D | D | D | A |

TABLE 5

| | Sample | | | |
|---|---|---|---|---|
| | Cutter load voltage (V) | Label support backside barrier property | Result of evaluation | |
| | | | Jamming | Adhesive property |
| Ex. 14 | 0.7 | AA | B | A |
| Comp. Ex. 5 | 3.7 | D | D | B |

As presented in the field "ΔV(ave)" in Table 4 and Table 5, the evaluation of the cutter load voltage measurement revealed that ΔV(ave) was less than or equal to 2.0 V in Examples 1 to 14, whereas ΔV(ave) was greater than 2.0 V in Comparative Examples 1 to 5.

As presented in the field "print image fading" in Table 4, in the evaluation of cutter blade contamination, the number of label pieces on which print image fading occurred in Examples 1 to 13 in which ΔV(ave) was less than or equal to 2.0 V was smaller than the number of such label pieces in Comparative Examples 1 to 4 in which ΔV(ave) was greater than 2.0 V. Above all, the number of label pieces on which print image fading occurred was particularly small in Examples 8, 9, and 11 in which ΔV(ave) was less than or equal to 1.5 V, and print image fading did not occur in Examples 1, 2, 4, 6, and 13 in which ΔV(ave) was less than or equal to 1.0 V.

As presented in the field "jamming" in Table 4 and Table 5, in the evaluation of cutter blade contamination, jamming did not occur in Examples 1 to 14 in which ΔV(ave) was less than or equal to 2.0 V, whereas jamming occurred in Comparative Examples 1 to 5 in which ΔV(ave) was greater than 2.0 V.

As presented in the field "adhesive force" in Table 4 and Table 5, in the evaluation of an adhesive force, all of Examples 1 to 12 and 14 and Comparative Examples 1 to 5 obtained a favorable result, whereas Example 13 could not obtain a sufficient adhesive force because the amount of the adhesive was reduced from the amount in Example 1. That is, it was possible to reduce adhesion of the adhesive to the cutter blades by reducing the attached amount of the adhesive over the linerless label to lower ΔV(ave). However, this method reduced the adhesive force and made the function as the label problematic.

As described above, ΔV(ave) of the linerless labels of Examples 1 to 14 was less than or equal to 2.0 V. This made it possible to reduce a load applied on the cutter blades of the apparatus during cutting of the linerless labels, and to suppress accumulation of the adhesive over the cutter blades during cutting of the linerless labels. This made it possible to expect prevention of print image fading and cuttability degradation (in the case of a cutting apparatus including a thermal head) due to accumulation of the adhesive over the cutter blades, and reduction of the frequency of removing the adhesive over the cutter blades.

Although the preferred embodiment, etc. have been specifically described, the present invention is not limited to the embodiment, etc. described above, but various modifications and substitutions may be applied to the embodiment, etc. described above without departing from the claimed scope.

Aspects of the present invention are as follows, for example.

<1> A linerless label including:
a support;
a release layer over one surface of the support; and
an adhesive layer over another surface of the support,
wherein when the linerless label is cut with an apparatus including a mechanism in which an upper blade of cutter blades is immobilized and a lower blade of the cutter blades is configured to move upward, in a manner that the lower blade is inserted into the linerless label from a side of the linerless label at which the adhesive layer is provided, a cutter load voltage during a cutter operation performed after the linerless label is cut five thousand times repeatedly has a difference of less than or equal to 2.0 V from the cutter load voltage during cutting of a label support, which is the linerless label before treated to have adhesiveness.

<2> The linerless label according to <1>,
wherein when a label support backside barrier property test is performed by application of a wet reagent having a surface tension of 34 mN/m over a surface of the label support over which the release layer is not provided, longer than or equal to 20 seconds is taken for the wet reagent to complete permeating the label support.

<3> The linerless label according to <1> or <2>, further including
a backside barrier layer between the support and the adhesive layer,
wherein the backside barrier layer contains at least one resin selected from the group consisting of an acrylic acid ester copolymer, a styrene/butadiene/acrylic-based copolymer, a styrene/acrylic acid ester copolymer, a natural rubber-based resin, a styrene/butadiene copolymer, an acrylonitrile/butadiene copolymer, polychloroprene, ethylene/vinyl acetate, and a polyolefin-based resin.

<4> The linerless label according to <3>,
wherein the resin has a glass transition temperature in a range of from minus 10 degrees Celsius through 100 degrees Celsius.

<5> The linerless label according to <3> or <4>,
wherein the backside barrier layer further contains at least one of an organic filler and an inorganic filler.

<6> The linerless label according to any one of <1> to <5>,
wherein the linerless label is a linerless label for thermal recording, the linerless label for thermal recording including a thermosensitive color-developing layer, a protective layer, and the release layer laminated in order over the one surface of the support and the adhesive layer over the another surface of the support.

<7> A method for producing the linerless label according to any one of <1> to <6>, the method including
a step of applying an adhesive over a surface of the label support over which the release layer is not provided and drying the adhesive to form the adhesive layer.
<8> A method for producing the linerless label according to any one of <1> to <6>, the method including
a step of transferring an adhesive applied and dried over a base having releasability to a surface of the label support over which the release layer is not provided together with the base, and peeling only the base to form the adhesive layer.
<9> A cutting apparatus including two cutter blades configured to cut the linerless label according to any one of <1> to <6>, one of the cutter blades being above the linerless label and another of the cutter blades being below the linerless label.
<10> A thermal recording apparatus including:
the cutting apparatus according to <9>; and
a recording unit configured to perform recording over the linerless label for thermal recording according to <6>.
<11> A method for producing a linerless label, the method including
a step of cutting a linerless label with the cutting apparatus according to <9> in a manner to immobilize an upper blade of the cutter blades and move a lower blade of the cutter blades upward to insert the lower blade into the linerless label from a side of the linerless label at which an adhesive layer is provided over the linerless label or in a manner to immobilize the lower blade of the cutter blades and move the upper blade of the cutter blades downward to insert the upper blade into the linerless label from a side of the linerless label opposite to the side at which the adhesive layer is provided, to form a single label piece.

REFERENCE SIGNS LIST 1 linerless label
2 label support
3 linerless label for thermal recording
4 label support for thermal recording
10 support
10a one surface of support
10b another surface of support
11 undercoat layer
12 thermosensitive color-developing layer
13 protective layer
14 release layer
15 backside barrier layer
16 adhesive layer
100 apparatus
110 housing
120 upper blade
130 lower blade
140 motor
141, 142 terminal
150 conveying unit
160 thermal head
170 cutter unit base
171 ejecting port
180 lower blade attaching jig
190 cutter unit protecting cover

The invention claimed is:

1. A linerless label comprising:
a support;
a release layer over one surface of the support;
an adhesive layer over another surface of the support; and
a backside barrier layer between the adhesive layer and the support,
wherein when the linerless label is cut with an apparatus that comprises a mechanism in which an upper blade of cutter blades is immobilized and a lower blade of the cutter blades is configured to move upward, in a manner that the lower blade is inserted into the linerless label from a side of the linerless label at which the adhesive layer is provided, a cutter load voltage during a cutter operation performed after the linerless label is cut five thousand times repeatedly has a difference of less than or equal to 2.0 V from the cutter load voltage during cutting of a label support, which is the linerless label before treated to have adhesiveness,
wherein the linerless label is a linerless label for thermal recording,
wherein the linerless label for thermal recording comprises a thermosensitive color-developing layer, a protective layer, and the release layer laminated in order over the one surface of the support and the adhesive layer over the another surface of the support,
wherein an attached amount of the adhesive is in a range of from 8 g/m$^2$ through 30 g/m$^2$ after dried, and
wherein the backside barrier layer comprises at least one resin having a SP value of greater than or equal to 8.0 and less than or equal to 10.6 selected from the group consisting of an acrylic acid ester copolymer, a styrene/butadiene/acrylic-based copolymer, a styrene/acrylic acid ester copolymer, a natural rubber-based resin, a styrene/butadiene copolymer, an acrylonitrile/butadiene copolymer, a polychloroprene-based resin, a vinyl acetate-based resin, an ethylene/vinyl acetate-based resin, a polyolefin-based resin, a melamine resin, and a polyurethane resin.

2. The linerless label according to claim 1,
wherein when a label support backside barrier property test is performed by application of a wet reagent having a surface tension of 34 mN/m over a surface of the label support over which the release layer is not provided, longer than or equal to 20 seconds is taken for the wet reagent to complete permeating the label support.

3. The linerless label according to claim 1,
wherein the resin has a glass transition temperature in a range of from minus 10 degrees Celsius through 100 degrees Celsius.

4. The linerless label according to claim 1,
wherein the backside barrier layer further comprises at least one of an organic filler and an inorganic filler.

5. The linerless label according to claim 1,
wherein the thermosensitive color-developing layer includes a leuco dye and a developer.

* * * * *